(12) United States Patent  
Morioka et al.

(10) Patent No.: US 8,208,792 B2  
(45) Date of Patent: Jun. 26, 2012

(54) CONTENT SHOOTING APPARATUS FOR GENERATING SCENE REPRESENTATION METADATA

(75) Inventors: Yoshihiro Morioka, Nara (JP); Kenji Matsuura, Nara (JP); Masaaki Kobayashi, Hyogo (JP); Akihiro Takeuchi, Nara (JP); Takashi Kurama, Osaka (JP); Hisashi Inoue, Nara (JP); Takeshi Hamasaki, Osaka (JP); Michifumi Inai, Osaka (JP); Masakazu Mimura, Osaka (JP)

(73) Assignee: Panasonic Corporation, Osaka (JP)

( * ) Notice: Subject to any disclaimer, the term of this patent is extended or adjusted under 35 U.S.C. 154(b) by 896 days.

(21) Appl. No.: 12/298,644

(22) PCT Filed: Sep. 12, 2007

(86) PCT No.: PCT/JP2007/067731  
§ 371 (c)(1),  
(2), (4) Date: Oct. 27, 2008

(87) PCT Pub. No.: WO2008/032739  
PCT Pub. Date: Mar. 20, 2008

(65) Prior Publication Data  
US 2009/0103898 A1  Apr. 23, 2009

(30) Foreign Application Priority Data

Sep. 12, 2006 (JP) ................................. 2006-247213  
Sep. 12, 2006 (JP) ................................. 2006-247214

(51) Int. Cl.  
*H04N 9/80* (2006.01)

(52) U.S. Cl. ........................................ 386/248; 715/723

(58) Field of Classification Search .................. 386/248, 386/344; 715/723; 348/208.1, 208.2, 231.3  
See application file for complete search history.

(56) References Cited

U.S. PATENT DOCUMENTS 5,267,034 A * 11/1993 Miyatake et al. ............. 348/352  
6,211,912 B1 * 4/2001 Shahraray ................. 348/228.1  
6,807,361 B1 * 10/2004 Girgensohn et al. .......... 386/227  
6,877,134 B1 * 4/2005 Fuller et al. .................. 715/202  
(Continued)

FOREIGN PATENT DOCUMENTS

EP  1 326 448 A2  7/2003  
(Continued)

OTHER PUBLICATIONS

M. Kumano et al., "Video Editing Support System Based on Video Content Analysis," ACCV2002: The 5th Asian Conference on Computer Vision, Jan. 23-25, 2002, Melbourne, Australia Jan. 25, 2002.

(Continued)

*Primary Examiner* — David Harvey  
(74) *Attorney, Agent, or Firm* — McDermott Will & Emery LLP

(57) ABSTRACT

In a content shooting apparatus (Acc) for recording content data (Sav) containing video, audio, or data onto an information recording medium (214), in combination with first metadata (Di, Dm) containing a parameter representing scene information (SI), and allowing access to a specific portion of the content (Sav) with reference to the scene information (SI), a camera microcomputer (206) detects movement of a camera (101) to generate the first metadata (Di, Dm) by comparing the detected movement with a predetermined value (Th), and also generates second meta data (Di, Dm) by filtering out the first metadata (Di, Dm) generated within a predetermined specific window period (W) via a predetermined function.

23 Claims, 15 Drawing Sheets

U.S. PATENT DOCUMENTS

| | | | |
|---|---|---|---|
| 7,123,816 B2 * | 10/2006 | McGrath et al. | 386/331 |
| 7,366,406 B2 * | 4/2008 | Hoshino et al. | 386/337 |
| 7,884,860 B2 * | 2/2011 | Morioka et al. | 348/231.6 |
| 2002/0120925 A1 * | 8/2002 | Logan | 725/9 |
| 2003/0020966 A1 * | 1/2003 | Yashiro | 358/496 |
| 2003/0085997 A1 * | 5/2003 | Takagi et al. | 348/143 |
| 2003/0093810 A1 | 5/2003 | Taniguchi | |
| 2003/0146915 A1 * | 8/2003 | Brook et al. | 345/473 |
| 2003/0234805 A1 * | 12/2003 | Toyama et al. | 345/723 |
| 2004/0012623 A1 * | 1/2004 | Yashiro et al. | 345/723 |
| 2004/0086265 A1 | 5/2004 | Tojo et al. | |
| 2005/0031296 A1 * | 2/2005 | Grosvenor | 386/4 |
| 2007/0046783 A1 * | 3/2007 | Shimada | 348/208.99 |
| 2008/0075431 A1 * | 3/2008 | Moriya et al. | 386/95 |

FOREIGN PATENT DOCUMENTS

| | | |
|---|---|---|
| JP | 03-090968 | 4/1991 |
| JP | 05-252432 | 9/1993 |
| JP | 06-165009 | 6/1994 |
| JP | 2003-134435 | 5/2003 |
| JP | 2004-153764 | 5/2004 |
| JP | 2004-362610 | 12/2004 |
| JP | 2004-363825 | 12/2004 |
| JP | 2005-252372 | 9/2005 |
| JP | 2005-286437 | 10/2005 |
| JP | 2006-018972 | 1/2006 |
| JP | 3781715 | 5/2006 |
| WO | WO 2004/109698 A1 | 12/2004 |

OTHER PUBLICATIONS

"MPEG-7 Overview," Joint Video Team (JVT) of ISO/IEC MPEG & ITU-T VCEG (ISO/IEC JTC1/SC29/WG11 and ITU-T SG16 Q6), XX, XX, No. N6828, Feb. 5, 2005.

Shin'ichi Takagi, "Tominaga Laboratory R&D Products," Tominaga Laboratory, Waseda University, Sep. 30, 2001.

Extended European Search Report issued in European Patent Application No. EP 07 80 7138.8 dated Nov. 5, 2009.

* cited by examiner

FIG. 10

| Camerawork (CW) | Shooting mode (CM) | | | | | | T220 |
|---|---|---|---|---|---|---|---|
| | Normal | Portrait | Sports | Low light | Spotlight | Nightview | |
| Rec. start | 50 | 50 | 50 | 50 | 50 | 50 | |
| Rec. pause | 25 | 25 | 25 | 25 | 25 | 25 | |
| Panning | 23 | 18 | 38 | 33 | 23 | 28 | |
| Tilting | 20 | 15 | 33 | 30 | 20 | 25 | |
| Zooming in | 35 | 55 | 35 | 45 | 45 | 45 | |
| Zooming out | 30 | 30 | 30 | 40 | 40 | 40 | |
| Fixed shot | 70 | 70 | 70 | 70 | 70 | 70 | |
| Audio input | 48 | 48 | 50 | 48 | 48 | 48 | |

CONTENT SHOOTING APPARATUS FOR GENERATING SCENE REPRESENTATION METADATA

RELATED APPLICATIONS

This application is the U.S. National Phase under 35 U.S.C. §371 of International Application No. PCT/JP2007/067731, filed on Sep. 12, 2007, which in turn claims the benefit of Japanese Application No. 2006-247214, filed on Sep. 12, 2006 and Japanese Application No. 2006-247213, filed on Sep. 12, 2006, the disclosures of which Applications are incorporated by reference herein.

TECHNICAL FIELD

The present invention relates to content shooting apparatuses, and more specifically to a content shooting apparatus in which an appropriate number of pieces of scene representation metadata suitable for digest playback, for example, can be generated based on numerous pieces of metadata, such as camerawork and recorded sound during shooting of moving images.

BACKGROUND ART

Conventionally, movies, television dramas, etc., have been shot in accordance with scenarios (scripts) created based on storyboards, for example. The scenario has its title (name), and consists of a plurality of scenes. Also, the scene consists of a plurality of cuts. A director provides directions in accordance with the scenario, and performers, such as actors, actresses, and extras, act in accordance with descriptions in the scenario. In the cases of, for example, live stage acts and concerts, performance is carried out in order of scenes specified in the scenario. On the other hand, in the cases of movies, dramas, etc., shooting is rarely carried out in order of scenes specified in the scenario.

Accordingly, in many cases, each video cut is shot in a condition or state different from conditions or states for video cuts before and after that video cut. As a result, a piece of video footage might be made out of a series of artificial video cuts connected in an unnatural manner. In some cases, erroneous editing that misses such unnatural connections might ruin the work (movie). Therefore, in order to prevent erroneous editing, it is necessary to take records of scene shooting, and appropriately manage shot scene information.

Editing after scene shooting is an extremely labor- and time-consuming task. Concretely, original content (video, audio, data) stored in a master medium, which has video scenes recorded thereon, is initially selected in accordance with the intent of a content creator with reference to the shot scene information recorded in handwriting by a scripter, an assistant director, or the like. For example, a film, tape, or optical disk, or a card employing flash memory, can be used as the master medium.

The selected original content is then subjected to edit processing, such as synthesizing. Thereafter, a movie or drama is completed through reconnection of the content subjected to edit processing. As described above, editing after shooting is an extremely labor- and time-consuming task. Therefore, there has been some demand to improve the efficiency of the editing task.

To meet the demand to improve the efficiency of the editing task, Patent Document 1 proposes a metadata input method and an edit system. Specifically, when generating content-related metadata or tagging content with metadata, keywords, which have been previously extracted from, for example, the scenario for the created content, are inputted by voice. Thereafter, a dictionary genre and the priority order of the keywords are determined in accordance with the scenario, and the metadata is generated by voice recognition means. This method employs voice recognition to allow efficient metadata assignment, even if the metadata is assigned at intervals of a few seconds, which is difficult to achieve by key input. The metadata can also be used as a keyword(s) for scene search.

In addition, a device for analyzing scenario information, as described in Patent Document 2, is known. This device includes a scenario information storage portion, a reference information storage portion, a calculation portion, and an output portion. The information storage portion stores scenario information sorted by scene. The reference information storage portion stores reference information concerning data contained in the scenario information. The calculation portion extracts data from the scenario information, and calculates output information based on the extracted data and the reference information before outputting to the output portion.

Based on data contained in the scenario and reference information related to that data, the scenario information analyzing device thus configured is capable of automatically calculating and outputting output information, such as an appropriate shooting schedule, as well as analyzing the scenario information. Thus, it is possible to shorten a time period for arranging a shooting schedule, as well as to expeditiously complete shooting by carrying out the shooting in accordance with the outputted shooting schedule, making it possible to reduce the cost of shooting.

Patent Document 1: Japanese Patent No. 3781715
Patent Document 2: Japanese Laid-Open Patent Publication No. 2004-362610

DISCLOSURE OF THE INVENTION

Problem to be Solved by the Invention

In conventional methods, apparatuses, and systems, as typified by Patent Documents 1 and 2, metadata is generated by camerawork patterns, such as panning and zooming, recorded sound, user operations, etc., at characteristic scenes between the start and the end of clip recording during shooting of moving images. The generated metadata is listed. After the end of the clip recording, a digest consisting of related clips can be generated using metadata in the list.

Essentially, metadata generated by numerous triggers, such as camerawork patterns, recorded audio, and user operations, does not have much significance by itself. In addition, the number of pieces of metadata generated tends to be enormous, and therefore the number of pieces of metadata obtained by shooting should be appropriately corrected. However, conventional techniques, including those described above, are not based on the concept of dynamically and flexibly adjusting the number of pieces of metadata. Specifically, even when each piece of metadata is appropriately generated, if the number of pieces of metadata is significant, most of the metadata is left unused.

As such, the number of pieces of metadata generated by the user shooting subjects with a content shooting apparatus tends to be enormous. This results in a problem as to which piece of metadata is to be selected when performing metadata-based digest playback.

Therefore, an objective of the present invention is to provide a content shooting apparatus in which an appropriate number of pieces of scene representation metadata suitable for digest playback, for example, can be generated based on numerous pieces of metadata generated for shot images.

Means for Solving the Problem

To achieve the above objective, the present invention provides a content shooting apparatus for recording content data containing video, audio, or data onto a recording medium, in combination with first metadata generated with reference to first scene information representing a scene, and allowing access to a specific portion of the content data with reference to second scene information independently generated with reference to the first scene information (SI), the apparatus comprising:

shooting means for shooting a subject to generate the content data;

camerawork detection means for detecting movement of the shooting means;

first metadata generation means for comparing the detected movement with a predetermined value to generate the first metadata; and scene information generation means for filtering out one or more pieces of the first metadata generated within a predetermined specific window period by means of a predetermined function, thereby generating second metadata containing any of the following parameters: scene type, priority, start time, end time, and representative time.

Preferably, the predetermined function calculates a weighted total priority value of metadata generated within a window period of a predetermined length.

Preferably, the predetermined function sorts out highest-priority (SP) first metadata from among the first metadata generated within a window period of a predetermined length.

Preferably, the predetermined function sets one parameter at every interval of a predetermined period or longer.

Preferably, the predetermined function compulsorily adds one or more parameters upon each occurrence of a predetermined period within which no parameter is selected.

Preferably, the content shooting apparatus further comprises playlist generation means for generating a playlist by combining a plurality of scenes with reference to at least one of the following parameters contained in the second metadata: scene type, priority, start time, end time, and representative time.

Preferably, the content shooting apparatus further comprises parameter sorting-out means for sorting out the parameters contained in the second metadata with reference to the priority, such that the number of parameters is within a specified range.

Preferably, the content shooting apparatus further comprises ticker display means for providing descriptions about characteristics of characteristic scene sections composed of the second metadata, the characteristics being superimposed on playback video as tickers while playing back the scene sections in a specified order.

Preferably, the content shooting apparatus further comprises content selection means for selecting a content component associated with the parameter, such that an externally-provided digest playback time is not exceeded.

Preferably, the content shooting apparatus further comprises:

digest generation scheme specification means for receiving a specification of at least one of the following items concerning characteristic scenes to be included in a digest: priority, type, digest time length, and content-to-digest reduction ratio;

means for generating a file to be referenced for playing back the content data in accordance with the specified digest generation scheme with reference to a second priority list, which is auxiliary data for the file to be referenced for playback; and registration means for registering the file to be referenced for playback with a playback object list.

Preferably, the scene information generation means includes:

characteristic sound metadata generation means for detecting characteristic sound and generating characteristic sound metadata containing occurrence time and identification information concerning the characteristic sound; and a metadata selection memory for holding an output from the characteristic sound metadata generation means.

Preferably, the parameter is any one of the following: operation data concerning a lens portion in a camera, which at least indicates zooming status, aperture value, focal distance and shutter speed of the lens portion, horizontal or vertical inclination angle of the lens portion, angular velocity of the lens portion rotating in a horizontal or vertical direction, or forward-backward, rightward-leftward, or vertical movement acceleration of the lens portion; a user input command; or data obtained by camera control means performing a predetermined arithmetic process on the operation data.

Preferably, the scene information generation means includes:

recording result tag generation means for generating a recording result tag, which refers to acceptance, rejection, or abeyance of the content data (Sav) in accordance with a command inputted by a user, during or after an operation of recording the content data (Sav); and a metadata selection memory for holding an output from the recording result tag generation means.

Preferably, the content shooting apparatus further comprises:

data input means for inputting content-related information to a memory in the shooting apparatus as a recording information tag before shooting contents, the information containing at least one of the following: serial shooting number, shot scene number, shot cut number, shot take number, and shooting program information;

characteristic sound generation tag generation means for detecting characteristic sound and generating a characteristic sound generation tag, including occurrence time and identification information concerning the characteristic sound, during an operation of recording the shot contents; and means for recording the characteristic sound generation tag onto the information recording medium as metadata for the contents.

Preferably, the characteristic sound is clapping sound made by a clapperboard, a gunshot, or sound made by a drum.

Preferably, the content shooting apparatus further comprises means for rearranging the contents recorded on the recording medium that have a recording result tag indicating "acceptance", in ascending order of any of the following: the scene number, the cut number, and the take number.

Preferably, the content shooting apparatus further comprises:

means for registering content-related information as a new name for contents, the information containing at least one of the following: serial shooting number, shot scene number, shot cut number, shot take number, and shooting program information; and means for registering the contents' original name as metadata for the contents.

Preferably, the content shooting apparatus further comprises means for selecting a table upon each content shooting, the table containing a predetermined number of operating modes with variable priorities for the parameter, and indicating the priority for the parameter upon each selection of at least one of the predetermined number of modes to be selected.

Effect of the Invention

The content shooting apparatus according to the present invention allows generation of an appropriate number of pieces of scene representation metadata suitable for digest playback, for example, based on numerous pieces of metadata generated for shot images.

BRIEF DESCRIPTION OF THE DRAWINGS

FIG. 10 is a diagram for explaining a table stored in a ROM shown in FIG. 9.

DESCRIPTION OF THE REFERENCE CHARACTERS

Figure 1:
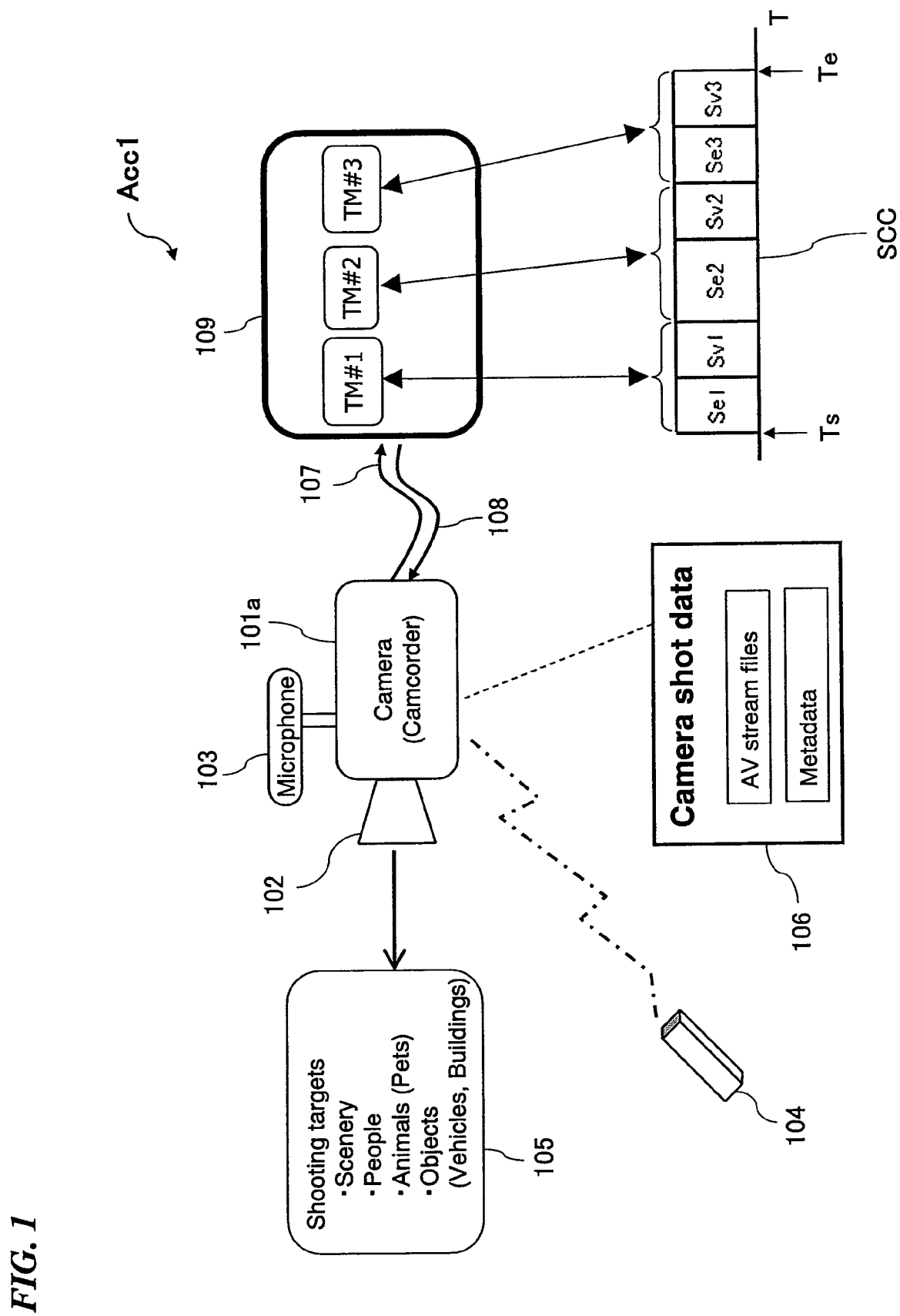
FIG. 1 is a diagram for explaining a content shooting apparatus according to a first embodiment of the present invention.

Acc1, Acc3, Acc3 content shooting apparatus
101a, 101b, 101c camera
102 lens portion
103 microphone
104 remote controller
105 shooting target
106 camera shot data
107 connection cable
108 connection cable
109 television set
201 zoom control portion
202 focus control portion
203 exposure control portion
204 image sensor
205 shutter speed control portion
206a, 206b, 206c camera microcomputer
206f clip identification portion
206i scene information generation portion
206k time code generation portion
206s camerawork detection portion
206t determination threshold setting portion
206u imager-operating-mode processing portion
206w content classification portion
207 absolute inclination sensor
208 angular velocity sensor
209 acceleration sensor
210a, 210b, 210c user input system
211 imaging signal processing portion
212 audio processing system
213 H.264 ENCODER
214 recording medium
215 output interface
220 ROM

BEST MODE FOR CARRYING OUT THE INVENTION

A content shooting apparatus according to a first embodiment of the present invention will be described with reference to FIG. 1. In FIG. 1, a content shooting apparatus Acc1 is depicted as an exemplary system model with an edit function of, for example, generating video data, audio data, and metadata on a recording medium (or a buffer memory) in a camera 101a, and deleting any invalid scene, or generating a digest, based on the generated metadata. The content shooting apparatus Acc1 preferably includes the camera 101a and a television set 109. The television set 109 may be any display means connected to the camera 101a and capable of video display and/or audio playback.

The camera 101a includes a lens portion 102 and a microphone 103. The camera 101a shoots shooting targets 105 in response to user operations on a remote control 104. The shooting targets 105 are subjects, e.g., scenery, people, animals, such as pets, vehicles, and buildings. Note that the camera 101a may include an operation device with a function equivalent to that of the remote control 104. Camera shot data 106 is generated based on shot images. The camera shot data 106 contains AV stream data files, which are video/audio data for the shot images, as well as metadata.

Note that signal transmission from the camera 101a to the television set 109 is carried out via a connection cable 107, while signal transmission from the television set 109 to the camera 101a is carried out via a connection cable 108. The user operates the remote control 104 at a location away from the camera 101a to display representative thumbnail screen images of important scenes contained in a digest on the television set 109 via the signal cable 107, or to play back content with invalid portions being deleted, or play back a digest (or a content summary).

In FIG. 1, exemplary displays on the television set 109 are shown as thumbnails TM#1, TM#2, and TM#3. A concept (scene classification concept SCC) of classifying valid scenes Se and invalid scenes Sv, which correspond to their respective thumbnails TM, is shown. In the classification concept SCC, the horizontal axis denotes time T, so that valid portions (valid scenes Se1, Se2, and Se3) and invalid portions (invalid scenes Sv1, Sv2, and Sv3) are indicated on that time axis. The valid scene Se1 and the invalid scene Sv1 correspond to the thumbnail TM#1, the valid scene Se2 and the invalid scene Sv2 correspond to the thumbnail TM#2, and the valid scene Se3 and the invalid scene Sv3 correspond to the thumbnail TM#3. Specifically, shooting by the camera 101a starts at time Ts, and ends at time Te.

For each of the valid scenes Se1, Se2, and Se3, and the invalid scenes Sv1, Sv2, and Sv3 in FIG. 1, clip processing can be facilitated by replacing flame images at the start time and the end time of the scene with their temporally closest I-pictures in a GOP structure.

For example, if the start times and the end times of the valid scenes Se1, Se2, and Se3, and the invalid scenes Sv1, Sv2, and Sv3 are such that:
(start time of Se1, end time of Se1)=(Se1s,Se1e);
(start time of Se2, end time of Se2)=(Se2s,Se2e);
(start time of Se3, end time of Se3)=(Se3s,Se3e);
(start time of Sv1, end time of Sv1)=(Sv1s,Sv1e);
(start time of Sv2, end time of Sv2)=(Sv2s,Sv2e);
and
(start time of Sv3, end time of Sv3)=(Sv3s,Sv3e),
then the start times and the end times in the case of the scene arrangement in FIG. 1 are given such that:
(end time of Se1)=(Se1e)=(start time of Sv1)=(Sv1s);
(end time of Sv1)=(Sv1e)=(start time of Se2)=(Se2s);
(end time of Se2)=(Se2e)=(start time of Sv2)=(Sv2s);
(end time of Sv2)=(Sv2e)=(start time of Se3)=(Se3s); and
(end time of Se3)=(Se3e)=(start time of Sv3)=(Sv3s).
The valid portions (valid scenes Se) include, for example:
fixed scenes after panning or zooming; and
scenes characterized by sound, such as cheers or handclaps.
On the other hand, the invalid portions (invalid scenes Sv) include, for example:
scenes with highly blurred (generally "unstable") images caused by camera jiggle;
out-of-focus scenes, scenes shot with excessively quick panning/tilting/zooming;
scenes with screen images darkened by backlight;
scenes with acoustic howling;
scenes shot by pointing at the ground; and
scenes taken with a cap on the camera.

As for images of the invalid portions (invalid scenes Sv) as described above, those with common sense and feelings would almost universally recognize that such images do not need to be played back. This is conceivably because value judgment about unacceptable matters generally greatly relies on human physiological perception and recognition mechanisms, and such value judgment is almost universal around the world. Therefore, any invalid portions (invalid scenes Sv) are desirably omitted at the time of digest playback, for example.

Note that the number of invalid scenes Sv can be preset in accordance with the length of content. For example, it is possible to set the number of invalid scenes Sv to at most 100, but at a rate of not more than five scenes per minute. In addition, it is possible to specify the type of the invalid scene Sv, and a reduction rate per content. Furthermore, in the case of shooting stable video using a tripod stand or suchlike, the shooting can be carried out with an invalid scene detecting function being manually turned OFF.

Described below is an example of detecting important scenes. It is possible to create an algorithm for extracting a fixed portion of one to three seconds at the beginning (CLIP-IN) or the end (CLIP-OUT) of a shot clip as an important portion (scene). It is also possible to create an algorithm for extracting sound detection metadata (a metadata portion for a detected input from a main or sub microphone, such as voice, sound of a clapperboard, gunshot, or cheers) as an important portion (scene).

Furthermore, it is possible to detect a fixed (static) scene after panning or tilting of the camera 101a based on an output from a gyro sensor included in the camera 101a. The fixed scene (a portion in which the camera operator has shot a fixed video image with interest; a portion of interest) can be extracted. It is also possible to detect a zoomed-in or zoomed-out portion (scene) by monitoring a change in the zoom value of the camera 101a over time.

More specifically, it is possible to create an algorithm for extracting a fixed portion of one to three seconds before or after zooming in or zooming out as an important portion (scene). It is also possible to detect a scene shot by panning or tilting the camera 101a based on an output from the gyro sensor. Furthermore, it is possible to divide a shot video image obtained from an image sensor into a plurality of blocks, and detect information that indicates, for each block, whether hue and chromaticity are within their predetermined ranges. For example, it is possible to detect a human face based on the size and shape of a detected block, and the degree of skin tone. Moreover, it is possible to detect a human face with higher accuracy based on the shape of a detected block and the degree of skin tone in a fixed video image after panning, tilting, or zooming.

The point to be noticed is that recognition of the important scene under the above-described conditions may slightly vary between those without skill in shooting and those skilled in camerawork for shooting, even if both of them have common sense and feelings. That is, those skilled in shooting carry out shooting, considering camerawork according to video shooting techniques, whereas those without skill do not have such knowledge, so that it is often the case that they shoot a subject without taking camerawork into consideration. However, it is usually the case that even those without skill gradually learn commonly acknowledged camerawork through advice from others and their own findings as they experience shooting.

Also, as for sorting of high-priority scenes, more stable scene sorting is made possible by sorting the high-priority scenes out from content with any low-priority scenes having been previously excluded therefrom. For example, in the case of scenes that are considered to be valid as high-priority scenes in a zoomed-in, fixed portion, if they are out of focus, such low-priority scenes can be preferentially excluded.

Similarly, in some cases, scenes that are considered to be valid as high-priority scenes in a zoomed-in, fixed portion have screen images darkened by backlight. Such low-priority scenes can be preferentially excluded. Also, in the case of scenes of a footrace in an athletic meet that are considered to be valid as high-priority scenes because a starter's gun shot is detectable, if they are unwatchable because of excessively quick zooming-in or panning, such low-priority scenes can be preferentially excluded.

As described above, a playlist is generated as the first step, so as to consist of stably shot scenes excepting any low-priority scenes. Next, as the second step, any high-priority scenes are sorted out from among the stable scenes. For example, the high-priority scenes are added to the playlist created by the first step to sort important scenes out from the content with any invalid portions having been excluded therefrom. With the above steps, it becomes possible to sort out visually more stable important scenes free from jiggle, out-of-focus blurring, etc.

Metadata for invalid scenes may be processed with a negative sign because of its negative meaning of "invalid". Note that any scene with a value between the high-priority scene (important scene) and the low-priority scene (invalid scene) can be handled as an ordinary scene (common scene).

In the example shown in FIG. 1, the three valid portions (the valid scenes Se1, Se2, and Se3) in the list displayed on the television set 109 are presented on the screen as their respective representative clips (thumbnails TM#1, TM#2, and TM#3). Each of these representative clips may be the first frame of its valid portion, or a representative frame within the valid portion. In addition, their valid portions and invalid portions are assigned their respective priorities, so that a digest can be generated by selecting only scenes with a specific priority.

Figure 2:
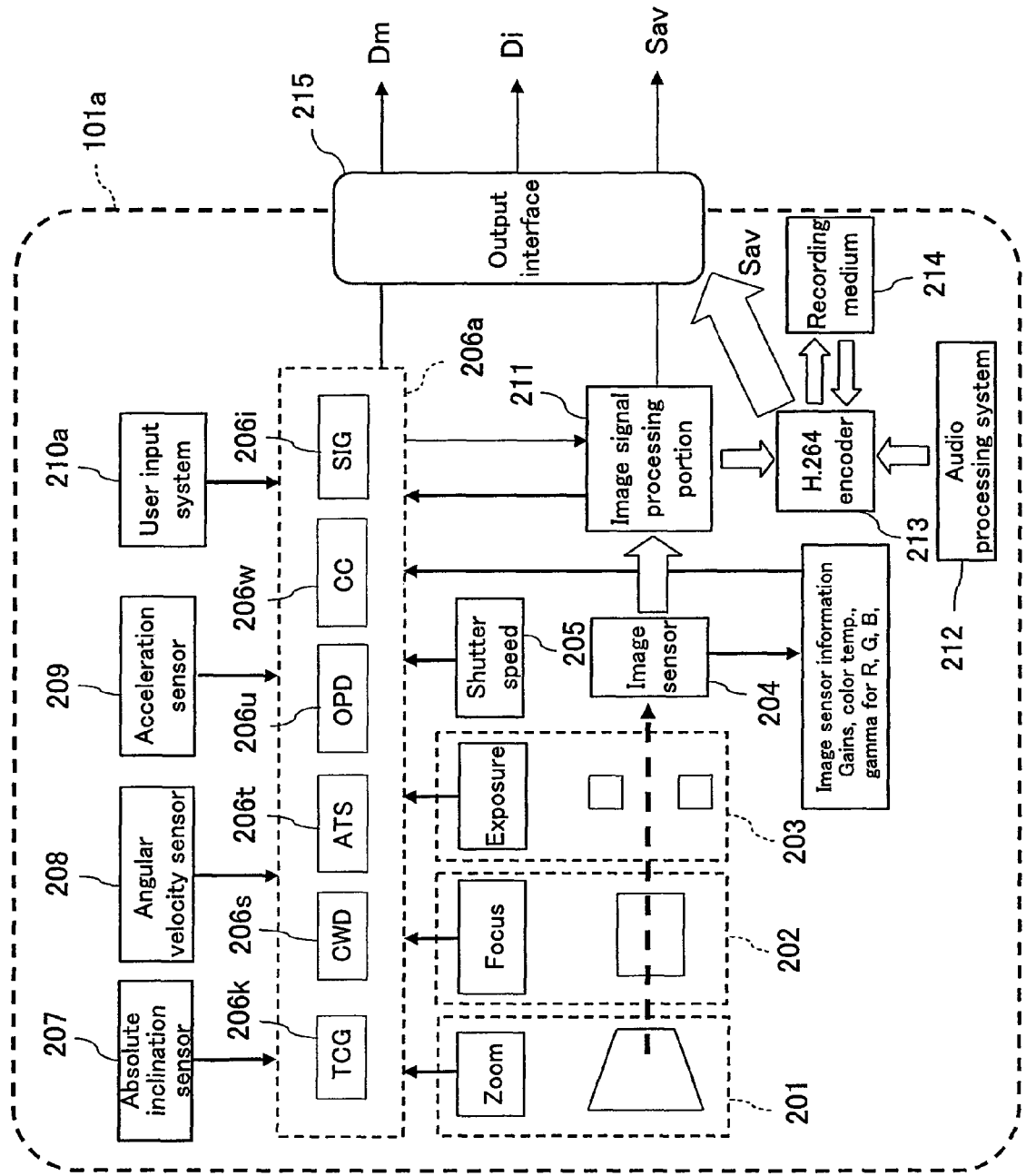
FIG. 2 is a diagram for explaining the internal configuration of a camera shown in FIG. 1.

Next, the internal configuration and operation of the camera 101a will be described with reference to FIG. 2. Provided in the camera 101a are a zoom control portion 201, a focus control portion 202, an exposure control portion 203, an image sensor 204, a shutter speed control portion 205, a camera microcomputer 206a, an absolute inclination sensor 207, an angular velocity sensor 208, a forward-backward/rightward-leftward/upward-downward acceleration sensor 209, a user input system 210a, an imaging signal processing portion 211, an audio processing system 212, an H.264 encoder 213, a recording medium 214, and an output interface 215.

The camera microcomputer 206a includes, as software algorithms, a time code generation portion 206k, a camerawork detection portion 206s, a determination threshold setting portion 206t, an imager-operating-mode processing portion 206u, a content classification portion 206w, and a scene information generation portion 206i (index generation means). The scene information generation portion 206i subjects data concerning panning, tilting, zooming, focus, audio input level, etc., of the imaging device to arithmetic operations specific thereto, thereby detecting the invalid scene and the important scene.

Note that because of limitations of space, the time code generation portion, the camerawork detection portion, the determination threshold setting portion, the imager-operating-mode processing portion, the content classification portion, and the scene information generation portion are respectively indicated as "TCG", "CWD", "ATS", "OPD", "CC", and "SIG" in the figure.

The zoom control portion 201 controls a zooming operation of the lens portion 102. The focus control portion 202 controls a focus operation of the lens portion 102. The exposure control portion 203 controls an exposure adjustment operation of the lens portion 102. The shutter speed control portion 205 controls a shutter speed adjustment operation of the image sensor 204. The absolute inclination sensor 207 detects horizontal/vertical absolute inclinations of the camera 101a. The angular velocity sensor 208 detects horizontal/vertical angular velocities of the camera 101a. The acceleration sensor 209 detects forward-backward/rightward-leftward/upward-downward accelerations of the camera 101a.

The user input system 210a generates an instruction signal in response to a user operation on a button or suchlike. In addition, the imaging signal processing portion 211 includes encoding means for MPEG2, H.264/AVC, etc. Note that the H.264/AVC scheme is described in detail, for example, in "H.264/AVC Kyokasho [Instructional Textbook on H.264/AVC]", edited by Sakae Okubo, published by Impress, Inc. Also, the MPEG-TS signal is defined by IEC 61883-4.

An example of the references for TS (transport stream) formats, such as PAT and PMT of the MPEG-TS standards, is "Gazo & Onsei Asshuku Gijyutsu No Subete (Internet/Digital Television, Mobile Tsuushin Jidai No Hisshuu Gijyutsu) ["All About Image and Audio Compression Techniques (Essential Techniques for the Era of Internet/Digital Television, Mobile Communication)"], TECH I Vol. 4, edited by Hiroshi Fujiwara, CQ Publishing Co., Ltd., Chapter 6, "Gazo Ya Onsei Wo Tajyuukasuru MPEG system [MPEG System for Image and Audio Multiplexing]", which provides explication of the TS formats. Also, hierarchical structures of PSI and SI, exemplary procedures, exemplary tuning processes are described in "Tuning Technology for Digital Broadcast Receiver", Miyake et al., SANYO Technical Review, VOL. 36, June, 2004, the No. 74 edition, pp. 31 to 44.

The angular velocity sensor 208 is generally composed of a gyro sensor, which detects the rotational accelerations with respect to three rotational axes "roll", "pitch", and "yaw". Calibration of detection sensitivity for the rotational accelerations is important. Recently, gyro sensors that are subjected to auto calibration, for example, a few seconds after power activation, have been commercialized.

The calibration of detection sensitivity for cameras including a gyro sensor is carried out considering variations among individual sensor devices, variations in detection sensitivity due to temperature, and variations in change of supply voltage. The calibration is carried out by providing vibration of a predetermined magnitude under predetermined conditions, and reducing the difference from an expected value for the sensor output at that time to a tolerance or lower. Such calibration can be carried out at factories.

As an auto calibration method, the amplifier gain is adjusted for an output amplitude in the case of jiggle, such that sensor outputs are constant at a normal calibration frequency. The normal calibration frequency can be provided, for example, by using a vibrator at a guaranteed vibration level. Vibration devices for signaling an incoming call when cell phones are in silent mode can also be used as the vibrators so long as their vibration levels are regulated. It is understood that any vibration sources with known vibration levels can be used as calibration means. Note that the calibration can be carried out with higher accuracy by using a plurality of vibration levels (e.g., three levels, such as high, mid, and low).

As an operation parameter, the image sensor 204 has image sensor operation data concerning at least one of the following: chromaticity space information at three primary color points; white color coordinates; gain information concerning at least two of the three primary colors; color temperature information; Δuv (delta uv); and gamma information concerning a three-primary color signal or a luminance signal. In the present embodiment, chromaticity space information at three primary color points, gain information concerning R (red) and B (blue) from among the three primary colors, and gamma curve information concerning G (green) are handled by way of example as metadata.

Note that if the chromaticity space information at three primary color points is known, it is possible to know the range in which color reproduction in a color space is possible. In addition, if the gain information concerning R (red) and B (blue) from among the three primary colors is known, it is possible to know color temperatures. Furthermore, if the gamma curve information concerning G (green) is known, it is possible to know half-toning characteristics. A sensor dedicated to color temperature detection may be provided such that the color temperature information is received from that sensor.

Lens zooming information, lens focus information, lens exposure information, image sensor shutter speed information, horizontal/vertical absolute inclination information, horizontal/vertical angular velocity information, forward-backward/rightward-leftward/upward-downward acceleration information, information concerning buttons used by the user for input, information concerning scene numbers, cut numbers, and take numbers, as well as acceptance, rejection, abeyance, etc., of the recorded takes, the chromaticity space information at three primary color points, the gain information concerning R (red) and B (blue) from among the three primary colors, and the gamma curve information concerning G (green) are handled by the camera microcomputer 206a as metadata Dm (referred to as camera metadata).

Image data, which is information taken by the image sensor 204, is subjected to processing, such as pixel defect correction and gamma correction, in units of pixel or in units of block consisting of a plurality of pixels, by the imaging signal processing portion 211, as well as to compression by an H.264/AVC encoder or suchlike before being stored to the recording medium 214 along with the aforementioned camera metadata. In addition, an AV signal Sav, which is generated by the H.264 encoder 213, and the camera metadata Dm, which is generated by the camera microcomputer 206a, are individually outputted from the output interface 215.

Described next is camera metadata Dm to be created during shooting of moving images by the camera 101a. Real-time metadata that is mapped to SEI in an H.264 stream includes, for example:
  metadata associated with AV content shot by a camera, such as a camcorder;
  metadata obtained by converting general data, such as shooting data, into metadata format;
  metadata obtained from SI (service information) in digital broadcasting;
  metadata, such as EPG information, obtained from EPG providers; and
  metadata, such as EPGs, obtained from the Internet.

Examples of the metadata associated with AV content shot by a camera include:
  information specifying buttons pressed by the user at important scenes (by which identification information, such as numbers, can be assigned);
  shooting data;
  time codes (video frames, audio frames);
  video and audio format information, such as shooting frame rate, recording frame rate, etc.;
  luminance and color information for video blocks; and
  audio input levels (maximum input levels for a designated channel during prescribed periods).

Note that the shooting data concerns image sensor operation mode, backlight correction, aperture/exposure information, focus, shutter speed information, color temperature, white balance, zooming, elevation angle, shooting or not shooting of the ground, unstable jiggling, blurring, pan/tilt/zoom (abbreviated as "PTZ") status, acoustic howling status, camera-cap-closed status, and camera posture status (horizontal/vertical absolute inclination information, horizontal/vertical angular velocity information, forward-backward/rightward-leftward/upward-downward acceleration information, etc.).

In addition, non-real-time metadata includes, for example:
  menu information;
  a title list (representative events, events registered by the user);
  scene numbers, cut numbers, take numbers, information concerning acceptance, rejection, abeyance, etc., of recorded takes;
  image recognition data (detection and recognition of faces, people, pets, etc.);
  audio recognition data;
  imaging system operation data, such as chromaticity space information at three primary color points of the image sensor, white color coordinates, gain information concerning at least two of the three primary colors, color temperature information, and $\Delta uv$ (delta uv);
  files inputted through external communication (texts, such as scenarios, which have been inputted as XML or binary data files via an external interface);
  gamma information for three-primary-color or luminance signals;
  still images; and
  thumbnails.

Of the above-described metadata, any necessary data is selected for use. The metadata can be described in the formats of property or attribute as adopted by UPnP and UPnP-AV. Such description formats are open to the public on http://upnp.org, and an efficient operation can be achieved by designing, considering use of text and XML (Extensible Markup Language).

Note that in order for a shooter of moving images or the like, a content creator, or a content copyright owner, to add value to each piece of metadata and collect viewing fees from content users depending on their usage details and content viewing frequencies, value-adding metadata can be associated with that piece of metadata. For each piece of metadata, the value-adding metadata may be provided as an attribute of target metadata or as an individual property.

Exemplary information related to recording equipment and recoding conditions will be described below. Such information includes camcorder manufacturer discrimination ID, device type discrimination ID, the name of a shooter of moving images or the like, the name of a content creator, etc. Furthermore, if metadata generated and registered by a content copyright owner is highly valuable, and therefore the content copyright owner considers the necessity of licensing, any feature for executing a process of giving a license to use the metadata through authentication can be incorporated into the configuration of the present invention, thereby making it possible to achieve an efficient operation.

In such a case, the shooter may create the shot moving image content in an encrypted file, and open the file to the public by uploading it onto a server on the Internet. It is also possible that the encrypted file is uploaded for posting, such that those who have interest in the file can purchase it. In the case where any content with a news value, such as accident video, has been recorded, the content can be auctioned among broadcast stations. By utilizing the metadata, it becomes possible to achieve efficient classification and search of an increasing amount of content.

Figure 3:
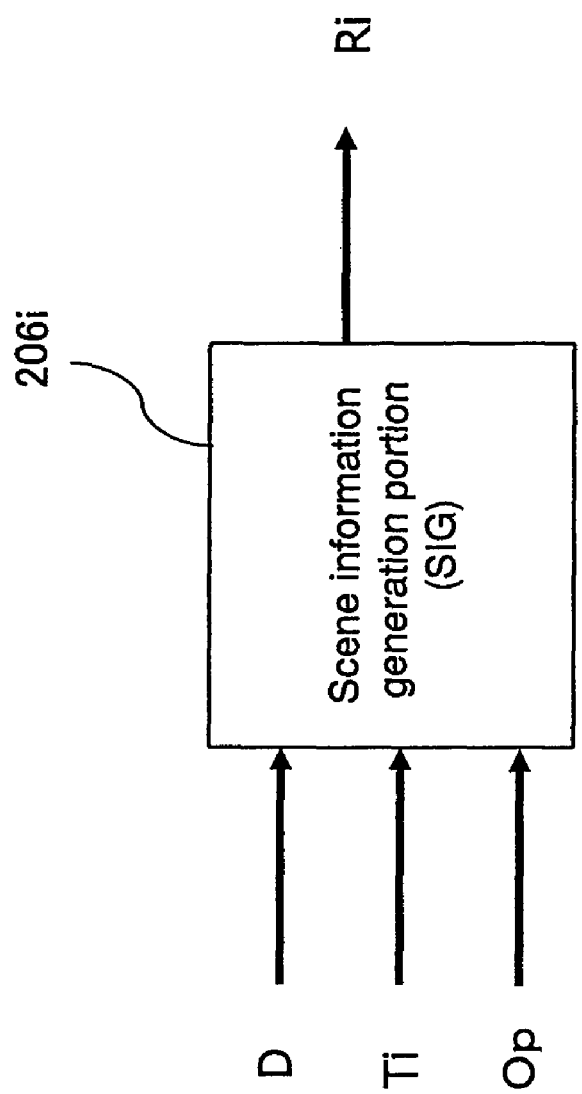
FIG. 3 is a diagram for explaining a scene information generation portion from which index information is outputted.

The scene information generation portion 206i will be described with reference to FIGS. 3 and 4. As shown in FIG. 3, the scene information generation portion 206i receives parameters D, which are used or generated when the camera is being operated, threshold information Ti, which indicates a determination threshold Th, and operating mode information Op about the camera. Then, the scene information generation portion 206i generates and outputs index information Ri (scene information) based on the received parameters and information in accordance with a scene information generating algorithm. Specifically, the index information Ri is information to which the scene information (SI) has been mapped.

The scene information generating algorithm merges numerous pieces of metadata generated for shot images, and generates an appropriate number of pieces of scene representation metadata suitable for digest playback, for example. Conventional metadata present during shooting includes numerous pieces of metadata, such as data concerning camerawork, recorded audio, and user operations. However, because such conventional metadata does not bear any significance by itself and a significant number of pieces of metadata are generated, metadata obtained by shooting should be appropriately processed, and converted to obtain a smaller number of pieces of metadata that bear significance. Accordingly, in the present embodiment, numerous pieces of metadata generated during shooting are merged to generate an appropriate number of pieces of scene representation metadata suitable for digest playback, for example.

Figure 4:
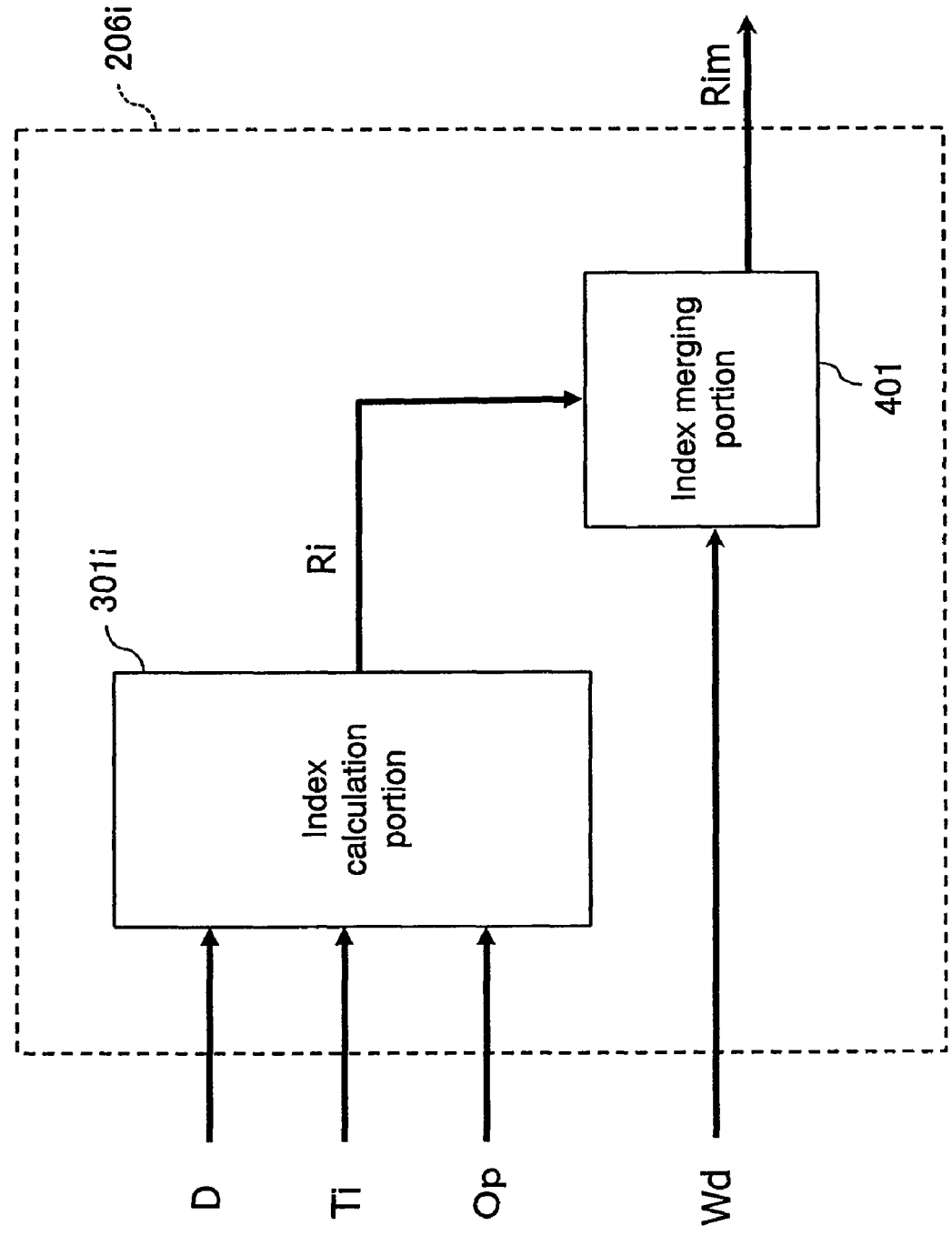
FIG. 4 is a block diagram illustrating the configuration of a scene information generation portion from which index merging information is outputted.

FIG. 4 illustrates an exemplary configuration of the scene information generation portion 206$i$ in which the scene information generation portion 206$i$ is configured to have an index merging function. The scene information generation portion 206$ia$ includes an index calculation portion 301$i$ and an index merging portion 401. The index calculation portion 301$i$ receives the camera operation parameters D, which are used or generated when the camera is being operated, the determination threshold information Ti, and the camera operating mode information Op. The index calculation portion 301$i$ generates and outputs the index information Ri to the index merging portion 401 based on the received parameters and information in accordance with the scene information generating algorithm.

The index merging portion 401 receives filter (window function) designation information Wd for index merging. The index merging portion 401 generates and outputs index merging information Rim for designating a filter for index merging, based on the index information Ri and the designation information Wd. Note that the index information Ri and the index merging information Rim are outputted from the output interface 215 as index data Di.

Figure 5:
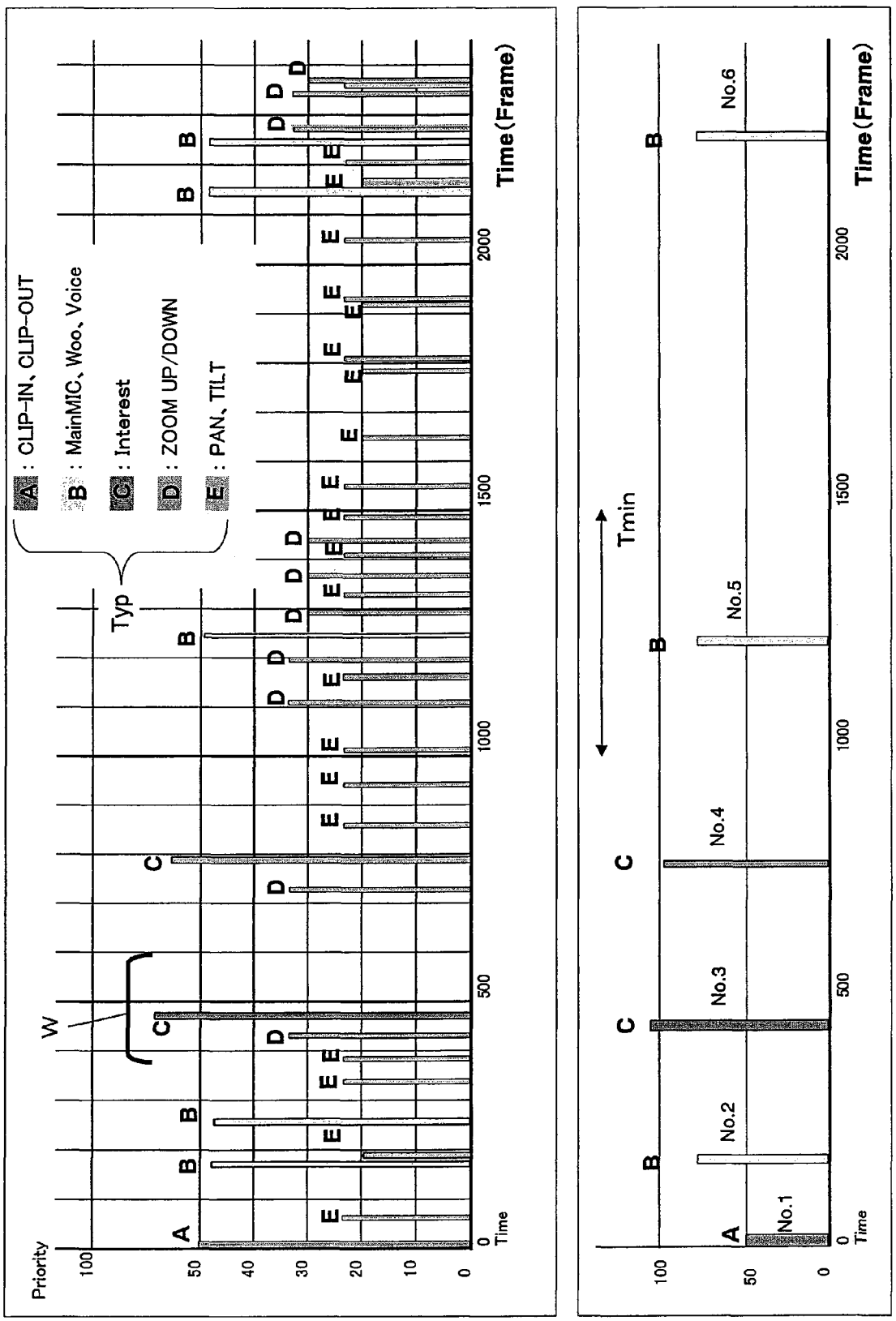
FIG. 5 is a diagram for explaining numerous pieces of shooting-related metadata, and a small number of pieces of scene representation metadata representing characteristic scenes.

Referring to FIG. 5, a plurality of pieces of first metadata generated in a shot clip, and a method for setting second metadata for digest generation based on the first metadata will be described. In FIG. 5, the plurality of pieces of first metadata generated through shooting by the content shooting apparatus Acc1 are shown in the upper row. Also, the second metadata generated based on the first metadata is shown in the lower row.

The second metadata is referred to as scene representation metadata for representing a small number of characteristic scenes. In FIG. 5, the horizontal axis is a time axis on which each time point is denoted by a video frame number. The vertical axis denotes the priority of the generated metadata up to the maximum of 100. Examples of the type of metadata (Typ) include the following A to E.

The type A includes the start (CLIP-IN) and the end (CLIP-OUT) of the clip. It is possible to create an algorithm for extracting fixed portions of one to three seconds at the start and the end of the clip as important portions.

The type B includes sound detection metadata (metadata for a detected input from a main or sub microphone, such as voice, sound of a clapperboard, gunshot, or cheers). It is possible to create an algorithm for extracting metadata portions for detected sound from a main or sub microphone, such as voice, sound of a clapperboard, gunshot, or cheers, as an important portion.

The type C includes a fixed portion (a portion in which the camera operator has shot a fixed video image with interest; a portion of interest).

The type D includes zoomed-in and zoomed-out portions. It is possible to create an algorithm for extracting a fixed portion of one to three seconds before/after zooming in or zooming out as an important portion.

The type E includes panned and tilted portions. As in the case of zooming, it is possible to create an algorithm for extracting a fixed portion of one to three seconds before/after a panned or tilted portion as an important portion.

The aforementioned types (Typ) are simply indicated as "A", "B", "C", "D", and "E". A window W of a given predetermined period is moved from the start to the end of the clip to select the second metadata. Then, digest playback can be carried out using the selected metadata. In the present example, the metadata with the highest priority within the window W is selected as the second metadata for use in digest generation. Concretely, the metadata "Interest" present around the four-hundred seventieth frame and representing the fixed state of the type C is selected.

Also, in the example shown in the lower row of FIG. 5, it is also possible to provide an additional mode to be set for selecting the second metadata only when the total value of priority metadata within the window W of a given period (the weighted total value of the priorities (SP)) exceeds a preset value (e.g., 250). In addition, it is also possible to set a minimum index generation interval Tmin, thereby compulsorily generating indices at certain intervals, for example, when no characteristic scene is detected for a predetermined period of time or longer. The minimum index generation interval Tmin is useful for the purpose of, for example, confirming the details of video every several seconds through browsing or suchlike. For example, if the setting is made such that the minimum index generation interval Tmin=5 seconds, an event (or a record) is displayed at least every five seconds, so that the user can perceive it.

The metadata shown in the upper row of FIG. 5 is merged, resulting in six pieces of metadata No. 1 through No. 6 shown in the lower row of FIG. 5. Note that the metadata No. 1 is of the type A with the priority of about 50, the metadata No. 2 is of the type B with the priority of about 80, the metadata No. 3 is of the type C with the priority of about 102, the metadata No. 4 is of the type C with the priority of about 98, the metadata No. 5 is of the type B with the priority of about 75, and the metadata No. 6 is of the type B with the priority of about 75. Accordingly, in the present example, the metadata No. 3 and the metadata No. 4 are qualified as important scenes. Note that when the number of pieces of metadata is 2, the metadata No. 3 is a shot image for a fixed section after zooming in, and the metadata No. 4 is a shot image for a fixed section after zooming out.

Figure 6:
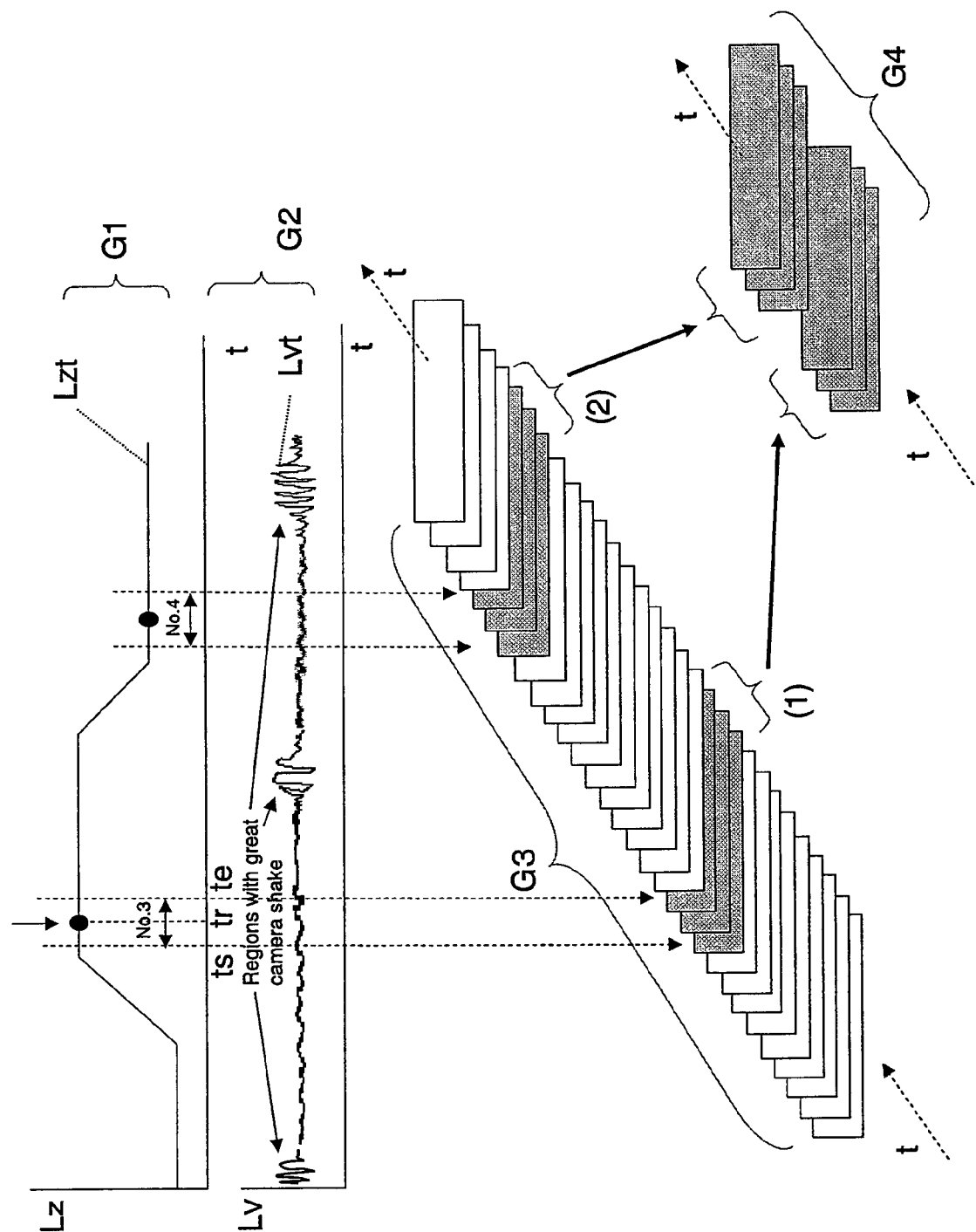
FIG. 6 is a diagram for explaining generation of the scene representation metadata shown in FIG. 5.

Referring to FIG. 6, a method for creating a digest by extracting the aforementioned fixed sections after zooming in (No. 3) and zooming out (No. 4) from the shot content will be described. In the figure, from top, graphic illustrations G1, G2, G3, and G4 are shown in this order. In graphic illustration G1, the vertical axis denotes the zoom level Lz for shooting, the horizontal axis denotes time t, and the solid curve Lzt denotes the change in zoom level Lz over time t.

Note that in graphic illustration G1, the time t progresses from left to right, and a higher zoom level Lz indicates a higher degree of zooming in. That is, the change of the solid curve Lzt in the bottom-to-top direction corresponds to zooming in, whereas the change in the top-to-bottom direction corresponds to zooming out. Graphic illustration G1 clearly specifies a portion corresponding to the metadata No. 3 shown in FIG. 5 (a fixed point after zooming in is selected as a representative point, thereby obtaining the metadata No. 3), and a portion corresponding to the metadata No. 4 (a fixed point after zooming out is selected as a representative point, thereby obtaining the metadata No. 4).

In graphic illustration G2, the vertical axis denotes the camera shake level Lv, the horizontal axis denotes time t, and the solid curve Lvt denotes the change in camera shake level Lv over time t. Note that in graphic illustration G2, the amount of camera displacement increases with the shake level Lv. It is shown that the more significant the vertical fluctuations of the solid curve Lvt, the greater the camera shake. Specifically, the camera shake increases at the beginning, the midpoint, and the end of shooting, i.e., at the start/end of the shooting operation and upon reversal of the zooming direction. The amount of camera shake is low at fixed portions after zooming in and zooming out.

Graphic illustration G3 shows a shot video (metadata) sequence. In graphic illustration 3, metadata (1) and (2), each consisting of three images, are respectively included in sections of the important scenes (metadata No. 3 and No. 4) in graphic illustration G1.

Graphic illustration G4 shows a digest video sequence based on the scene representation metadata (1) and (2) extracted from the video sequence shown in graphic illustration G3. In this manner, a digest can be created by extracting the important scenes (No. 3 and No. 4) from the shot video sequence (G3).

As described above, images in graphic illustration G1 are extracted in accordance with their priorities to obtain the digest video sequence in graphic illustration G4. Concretely, in the fixed section (No. 3) after zooming in, the extraction starts at time ts and ends at time te. Note that the image at time tr is representative of the fixed period (No. 3). These times are referred to as "start time ts", "end time te", and "representative time tr", respectively. Specifically, the images extracted for the digest are expressed as having the scene type (typ) of "zooming in", the priority (SP) of "72", the start time of "ts", the end time of "te", and the representative time of "tr".

Incidentally, as for horizontal or vertical translation parameters, analysis results for blurred video caused by camera shake have demonstrated that motion sickness is caused by frequency components in the range from about 0.5 Hz to 2 Hz, in particular, horizontal panning at 0.35 Hz to 1 Hz. As for rotation, motion at 30 to 70 degrees per second reportedly causes more severe motion sickness.

The likelihood of sickness being caused by rotational motion in one direction decreases according to the order: "roll", "pitch", and "yaw". Concretely, it has been reported that, in the case of large amplitude, motion sickness is readily caused by "roll" rotation at 60 degrees or less per second, "pitch" rotation at about 60 degrees per second, or "yaw" rotation at 90 degrees or more per second. Therefore, by detecting such rotation, it is possible to generate metadata representing the status of the rotation. In addition, it is possible to identify any invalid scene.

In the case of moving images where abrupt changes in the direction of motion occur without any blanks, motion sickness is readily caused. On the other hand, insertion of blanks makes motion sickness less likely to occur even when the direction of motion changes. Therefore, if excessive image blurring (camera shake) is detected, it is possible to reduce the chances of motion sickness by generating a playlist such that only video images in one direction are detected and displayed.

In addition, if camerawork, such as image blurring (camera shake), that is likely to induce motion sickness is detected, it is possible to provide sound or flashing light to give the shooter an alarm indicating, for example, that the camera is excessively jiggling, in accordance with the level of the camerawork.

Also, in the case of moving images, motion sickness readily occurs when the viewing angle is wide. Accordingly, camera shake is detected based on a signal from the gyro sensor that represents rotational accelerations with respect to "roll", "pitch", and "yaw", and global motion in video that occurs due to an abrupt change in the motion pattern of the camera, such as panning, tilting, zooming, and rolling, is calculated. Thereafter, time-frequency components of the global motion, as well as a motion speed at an expected viewing angle on the display, are calculated. Blurring caused by camera shake is then electronically removed to reduce the number of pixels in the vertical and horizontal directions of displayed video images, thereby reducing the chances of motion sickness, although the viewing angle is narrowed.

Note that in the case where a viewing screen size (e.g., 32 inches) and a viewing distance (e.g., 2 meters) are hypothetically set, and a threshold Thv for a horizontal/vertical parallel displacement velocity (e.g., a moving speed of ten or less pixels per frame) and a frequency threshold Thf (e.g., 0.5 Hz) are set, any state where the amount of detected image blurring exceeds the two thresholds Thv and Thf can be considered to be risky enough to cause motion sickness. Note that these thresholds Thv and Thf can be changed per shooting mode or per event to be shot.

Accordingly, for detection of camera shake, panning, and tilting, a plurality of thresholds for representative viewing angles (or screen sizes and viewing distances) are determined for detecting video sickness, so that camera shake, panning, and tilting can be detected with reference to these thresholds. Thus, by designating a viewing angle (or a screen size and a viewing distance) when viewing images, it becomes possible to make a setting in such a manner as to induce no video sickness at the viewing angle.

Next, an exemplary H.264/AVC file configuration will be described with reference to FIG. 7. A directory structure Sd is shown in the left rectangular block, and a file structure Sf is shown in the right rectangular block. These structures are constructed on an information recording medium, such as an SD card, a DVD-R, a DVD-RAM, or a BD-RE.

In the directory structure Sd, a reference file (ref.file), as well as "PlayList", "CLIP", and, "STREAM" directories, are present under root. A "*.pls" file, which is a playlist (file), is present under the "PlayList" directory. In addition, "*.clp" files, which are clip files, are present under the "CLIP" directory. "*.ats" files, which are stream files each composed of an ATS (192 bytes), are present under the "STREAM" directory.

In the file structure Sf, the reference file (ref.file) manages content title information (Title #n), as well as a plurality of pieces of chapter information (Chapter#1, C#2, C#3, C#4, . . . ). The playlist (PlayList#1) manages a plurality of pieces of playback part information (PlayItem#1, P#2, P#3, . . . ). In addition, the clip files (Clip#1, Clip#2, Clip#3, . . . ) have an EP map (EP_MAP). The EP map is a map table for cross-reference between PTSs and ATS serial numbers of ATS packets contained in the stream files, and the EP map is used for interconversion between time codes and data positions, and therefore indispensable for playing back playlists, as well as editing stream files.

As described above, a title is correlated with a playlist file, the playlist file is correlated with a clip file, and the clip file is correlated with an ATS packet in a stream file.

The above-described real-time metadata and non-real-time metadata are mapped to SEI, and thereafter converted into ATS stream files. In addition, metadata generated by an arithmetic operation based on the real-time or non-real-time metadata is used as clip scene information (SI) to map additional information to part information or an auxiliary area AA of the playlist. Specifically, a list with a priority is mapped as playlist file auxiliary data to be referenced at the time of playing back shot content.

Thus, an important feature is provided, which makes it possible to refer to clip scene information metadata (index information) by simply looking at data in the playlist file. Note that in the case of MPEG, the real-time metadata and the non-real-time metadata can be inserted into a private packet or a PMT.

In the case of the DVD-R, BD-RE/ROM, or AVCHD scheme, it is possible to carry out playback while skipping scenes with jiggle, i.e., scenes that might induce motion sickness. Specifically, scenes with excessive jiggle as described above are associated with time codes as metadata, and registered as markers for the playlist. A medium player conforming to a scheme as described above carries out playback with reference to marker information for the playlist or additional information of markers, such that scenes with jiggle are skipped.

By describing metadata associated with a time code TC as playlist information, it becomes possible for content playback equipment to instantaneously access (skip) a start or representative point of an event in shot content, such as an invalid scene or an important scene, with reference to information described in the playlist. In addition, by referring to a list of metadata, which is playlist file auxiliary data to be referenced at the time of playback, it becomes possible to sequentially play back a specified event section (an event section generated with reference to an event from the start to the end point).

In the case of generating the digest consisting of important scenes shown as graphic illustration G4 in FIG. 6, it is also possible to generate a new playlist file by using digest scheme specification means for inputting specifications of scene priority, scene type (Typ), digest time length, or ratio of reduction to digest, or by referring to a scene list, which is playlist auxiliary data.

Regarding the exemplary thumbnail displays shown in FIG. 1, a digest playlist consisting of important scenes includes three valid scenes:

(start time of Se1, end time of Se1)=(Se1$s$, Se1$e$);
(start time of Se2, end time of Se2)=(Se2$s$, Se2$e$); and
(start time of Se3, end time of Se3)=(Se3$s$, Se3$e$).

Furthermore, by referring to the playlist, it becomes possible to perform various types of playback, including modes as described below, for example:

Sections specified as important scenes are played back in a normal manner, and other scenes are played back at high speed.

Sections specified as invalid scenes are played back at high speed, and other scenes are played back at normal speed.

Sections specified as invalid scenes are played back, such that detected representative scenes or previously shot and registered still images are each displayed for three seconds, and other scenes are played back at normal speed.

Furthermore, regarding the exemplary thumbnail displays shown in FIG. 1, if normal playback is performed for the valid scenes Se1, Se2, and Se3, and five-times faster playback is performed for the invalid scenes Sv1, Sv2, and Sv3, the playlist can be expressed as:

(start time of Se1, end time of Se1)=(Se1$s$, Se1$e$), normal playback;
(start time of Sv1, end time of Sv1)=(Sv1$s$, Sv1$e$), five-times faster playback;
(start time of Se2, end time of Se2)=(Se2$s$, Se2$e$), normal playback;
(start time of Sv2, end time of Sv2)=(Sv2$s$, Sv2$e$), five-times faster playback;
(start time of Se3, end time of Se3)=(Se3$s$, Se3$e$), normal playback; and
(start time of Sv3, end time of Sv3)=(Sv3$s$, Sv3$e$), five-times faster playback.

As for shot content, in particular children's music recital, in consideration of the desire to listen to piano performance, choral performance, etc., without interruption, but not to see invalid video that is jiggling or out-of-focus, it is possible to play back audio without interruption, while playing back substitution video, which contains representative scenes or previously shot and registered video images (blue skies, buildings, flowers, faces of children, etc.).

Regarding the exemplary thumbnail displays shown in FIG. 1, if normal playback is performed for the valid scenes Se1, Se2, and Se3, and registered video images are played back for the invalid scenes Sv1, Sv2, and Sv3, the playlist can be expressed as:

(start time of Se1, end time of Se1)=(Se1$s$, Se1$e$), normal playback;
(start time of Sv1, end time of Sv1)=(Sv1, Sv1$e$), playback of registered video images;
(start time of Se2, end time of Se2)=(Se2$s$, Se2$e$), normal playback;
(start time of Sv2, end time of Sv2)=(Sv2$s$, Sv2$e$), playback of registered video images;
(start time of Se3, end time of Se3)=(Se3$s$, Se3$e$), normal playback; and
(start time of Sv3, end time of Sv3)=(Sv3$s$, Sv3$e$), playback of registered video images.

By using means for generating video with reference to the playlist, such that horizontal jiggling and vertical jiggling in shot video that are caused by camerawork are removed from sections specified as invalid scenes, it is possible to carry out playback, such that video is displayed with image jiggle being removed, and other scenes are played back at normal speed.

In addition, by extending the above-described thresholds Thv and Thf for data classification into thresholds at a plurality of levels, it becomes possible to make displays of different playback times (clip periods) for their respective threshold levels. For example, in the case where there are five levels of thresholds, when the threshold is at the mid level (Thv_3) within the range of thresholds from Thv_1 to Thv_5 (or similarly from Thf_1 to Thf_5), the playback time is displayed for each shot clip. If the playback time is longer than expected, the level of the threshold Thv is changed in such a manner as to shorten the playback time. Conversely, if the playback time is shorter than expected, the level of the threshold Thv is changed in such a manner as to lengthen the playback time.

In the case of making further finer settings, the playback time of each scene contained in a clip is displayed when the threshold for that scene is at the mid level (Thv_3) of the five thresholds Thv_1 to Thv_5. If the playback time is longer than expected, the level of the threshold Thv can be changed in such a manner as to shorten the playback time. Conversely, if the playback time is shorter than expected, the level of the threshold Thv can be changed in such a manner as to lengthen the playback time.

Also, if a total playback time is specified for a clip or a playlist, which is a collection of clips, it becomes possible to generate a playlist with approximately the same playback time as the specified time by creating a program for automatically setting a threshold per clip or scene.

By referring to a playlist, a new playlist, which consists of scenes at a predetermined priority level or higher, or scenes taken by specific camerawork, may be generated, and registered after a title is given thereto.

By referring to a playlist, it becomes possible to generate and play back background music in accordance with the type (Typ) of each scene, such that the melody, tone and tempo of the background music are changed immediately before changing of scenes, thereby achieving more artistically- and culturally-refined content playback.

As described above, the content shooting apparatus Acc1 shoots a subject 105 with the camera 101, thereby generating an AV signal Sav, which is content data containing video, audio, or data. Then, the camera microcomputer 206a (camerawork detection portion 206s) detects movement of the camera 101, and generates index data Di and camera metadata Dm, which constitute first metadata, with reference to first scene information (SI) representing a scene, while comparing the detected movement with a predetermined value Th (threshold information Ti). The AV signal Sav is combined with the first metadata, and recorded to a recording medium 214.

Furthermore, the camera microcomputer 206a (scene information generation portion 206i) filters out one or more pieces of first metadata (Di, Dm) generated within a predetermined specific window period (W) in accordance with a predetermined function, thereby generating index data Di and camera metadata Dm as second metadata containing any one of the following parameters: scene type Typ, priority SP, start time ts, end time te, and representative time tr. Moreover, the camera microcomputer 206a generates index information Ri, which index information is second scene information for the second metadata (Di, Dm), with reference to the first scene information SI, thereby making it possible to access a specific portion of the content (AV signal Sav) with reference to the index information Ri.

Note that examples of the above-described predetermined function that can be used by the camera microcomputer 206a include a function for calculating a weighted total of the priorities SP of the metadata generated within the window period W of a predetermined length, a function for sorting out the first metadata (Di and Dm) with the highest priority (SP) from among the first metadata generated within the window period W of a predetermined length, a function for setting one parameter at every interval of a predetermined period Tmin or more, and a function for compulsorily adding one or more parameters at every interval of the predetermined period Tmin when no parameter was selected within the predetermined period W.

The camera microcomputer 206a is configured to have, in addition to the above-described functions, the function of generating a playlist by combining a plurality of scenes with reference to at least one of the parameters contained in the index data Di and the camera metadata Dm, which constitute the second metadata: scene type Typ; priority SP; start time ts; end time te; and representative time tr.

Furthermore, the camera microcomputer 206a is configured to have the function of sorting out parameters contained in the index data Di and the camera metadata Dm, which constitute the second metadata, with reference to the priority SP, such that the number of parameters is equal to or less than a specified number.

Furthermore, the camera microcomputer 206a is configured to have the function of playing back characteristic scene sections composed of the index data Di and the camera metadata Dm, which constitute the second metadata, in a specified order, and superimposing descriptions of their characteristics on playback video as tickers when playing back the scene sections.

The camera microcomputer 206a is configured to have the function of selecting parameter-associated content components, such that an externally-provided digest playback time is not exceeded.

In addition, the camera microcomputer 206a is configured to have the function of receiving a specification of at least one of the following parameters for the characteristic scenes to be incorporated as a digest: priority SP, type Typ, digest time length, and content-to-digest reduction ratio, and generating a file to be referenced for playing back the content data (Sav) in accordance with a specified digest generation method with reference to a second priority list, which is auxiliary data for the file to be referenced for playback, thereby registering the file to be referenced for playback with a playback object list.

SECOND EMBODIMENT

Figure 8:
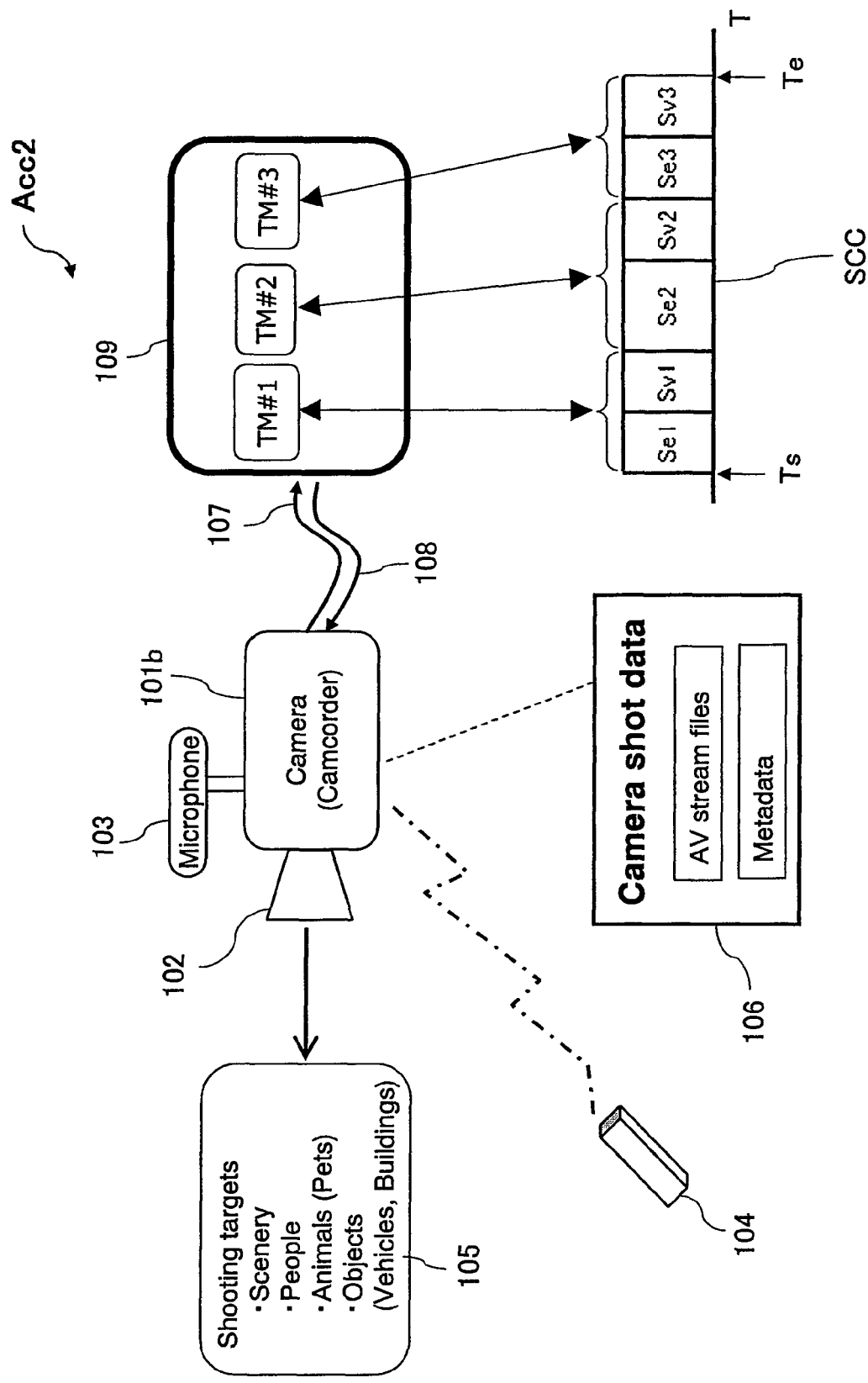
FIG. 8 is a diagram for explaining a content shooting apparatus according to a second embodiment of the present invention.
Figure 9:
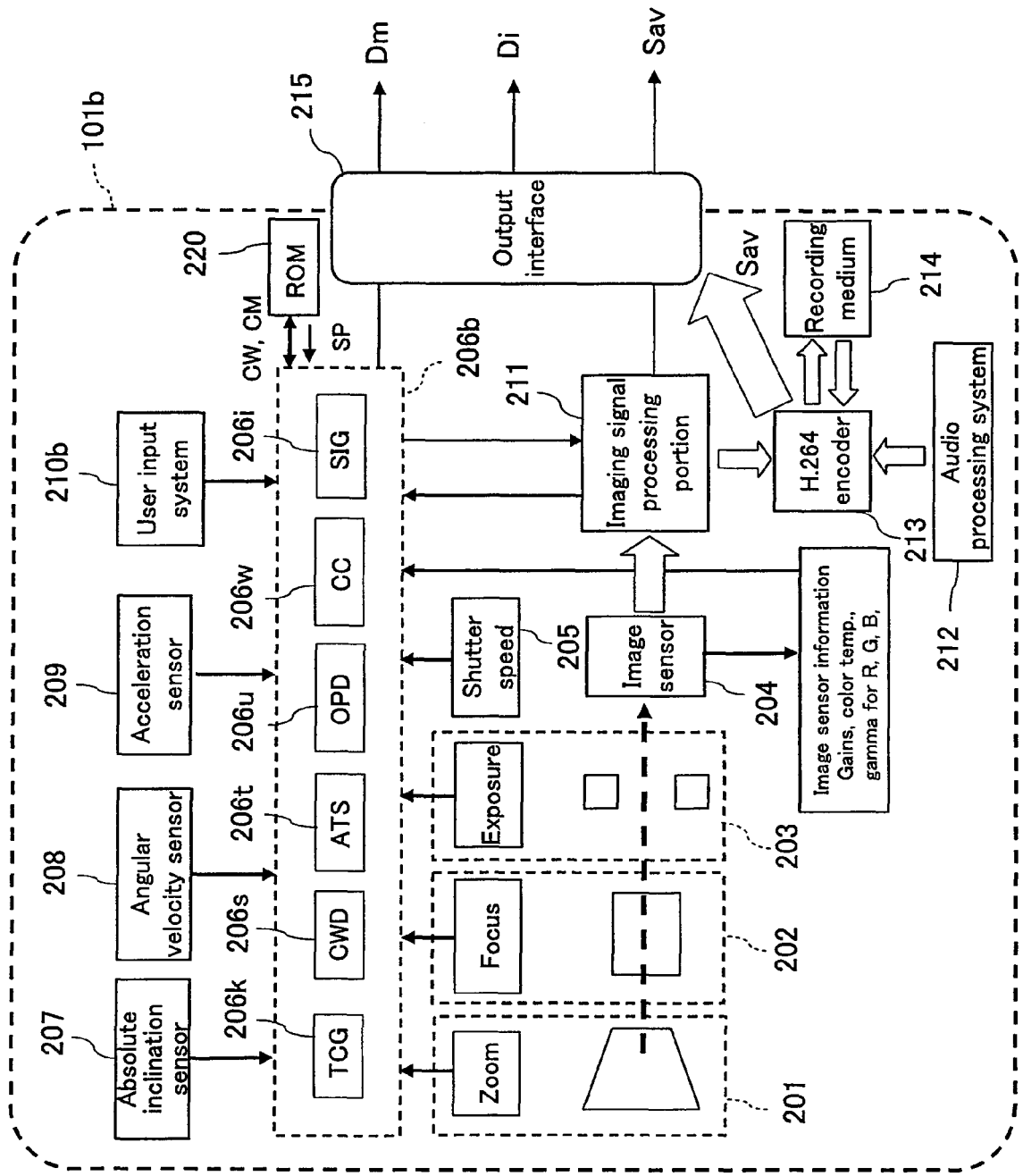
FIG. 9 is a diagram for explaining the internal configuration of a camera shown in FIG. 8.

Referring to FIGS. 8, 9, and 10, a content shooting apparatus according to a second embodiment of the present invention will be described below. As shown in FIG. 8, a content shooting apparatus Acc2 according to the present embodiment basically has the same configuration as the content shooting apparatus Acc1 shown in FIG. 1. As described above, the content shooting apparatus according to the first embodiment can change the levels of the data classification thresholds Th to display the playback time for each threshold. However, the content shooting apparatus Acc2 has the function of changing the priority to be assigned to the camerawork, such as panning, tilting, and fixing, and audio recording based on the shooting mode of the content shooting apparatus, as described in FIG. 5, in accordance with the operating mode of the camera.

The content shooting apparatus Acc2 includes a camera 101b, in place of the camera 101a of the content shooting apparatus Acc1, as shown in FIG. 9. Note that the camera 101b includes a microcomputer 206b and a user input system 210b, in place of the microcomputer 206a and the user input system 210a, respectively, of the camera 101a, and it additionally includes a ROM 220.

In addition to the above-described functions of the user input system 210a, the user input system 210b in the present example has the function of notifying the camera microcomputer 206b of the shooting mode of the content shooting apparatus Acc2 via a user operation. The camera microcomputer 206b selectively reads the priority to be assigned to shot scenes from the ROM 220 in accordance with the shooting mode inputted from the user input system 210b, thereby generating camera metadata Dm.

Referring to FIG. 10, the relationship between the shooting mode and the priority in the present embodiment will be described below. FIG. 10 shows an exemplary shooting mode/priority table T220 stored in the ROM 220. In this table, shooting modes of the content shooting apparatus Acc are shown in the uppermost row. User operations on the content shooting apparatus Acc2, i.e., the types of camerawork, are shown in the leftmost column.

In the present example, examples of the shooting mode to be set include "normal", "portrait", "sports", "low light", "spotlight", and "nightview". The camerawork to be set includes "REC. start", "REC. pause", "panning", "tilting", "zooming in", "zooming out", "fixed shot", and "audio input". In accordance with the "shooting mode" input by the user operation via the user input system 210b and the "camerawork" detected based on signals inputted from an absolute inclination sensor 207, an angular velocity sensor 208, and an acceleration sensor 209, the camera microcomputer 206b reads, as a priority, a score (15 to 70) SP, which is uniquely assigned to a combination of the camerawork CW and the shooting mode CM, from the shooting mode/priority table T220 in the ROM 220.

In this manner, the priority to be assigned to each camerawork (including audio recording) is changed in accordance with the scene mode for shooting, such as normal mode, portrait mode, sports mode, low light mode, spotlight mode, or nightview mode.

For example, in the case of the sports mode intended for faster-moving subjects, scores for panning and tilting indices are set to be greater than in the normal mode. In addition, in the case of the low light mode intended for shooting in a darker environment than usual, scores for zooming-in and zooming-out indices are also set to be greater than in the normal mode.

As such, the score for each index is changed, and therefore the score for a merged index can be changed. As a result, it is possible to extract an important scene suitable for each of the scene modes for shooting. Note that the camerawork, the shooting modes, and the scores (priorities) as shown in FIG. 10 are merely illustrative, and they can be arbitrarily set as necessary.

As described above, in the content shooting apparatus Acc2, the camera microcomputer 206b (scene information generation portion 206i) is configured to function as a metadata selection memory for detecting characteristic sound, generating characteristic sound metadata, which contains occurrence time (Tb) and identification information concerning the characteristic sound, and holding the generated characteristic sound metadata.

The camera microcomputer 206b is configured to have the function of selecting the shooting mode/priority table T220 upon each content shooting, the table containing a predetermined number of operating modes with variable priorities for the parameter, and indicating the priority for the parameter upon each selection of at least one of the predetermined number of modes to be selected.

In the content shooting apparatus Acc2, the aforementioned parameter is any one of the following: operation data concerning the lens portion in the camera, which at least indicates zooming status, aperture value, focal distance and shutter speed of the lens portion, horizontal or vertical inclination angle of the lens portion, angular velocity of the lens portion rotating in the horizontal or vertical direction, or forward-backward/rightward-leftward/vertical movement acceleration of the lens portion; a user input command; or data obtained by camera control means performing a predetermined arithmetic process on the operation data.

THIRD EMBODIMENT

Figure 11:
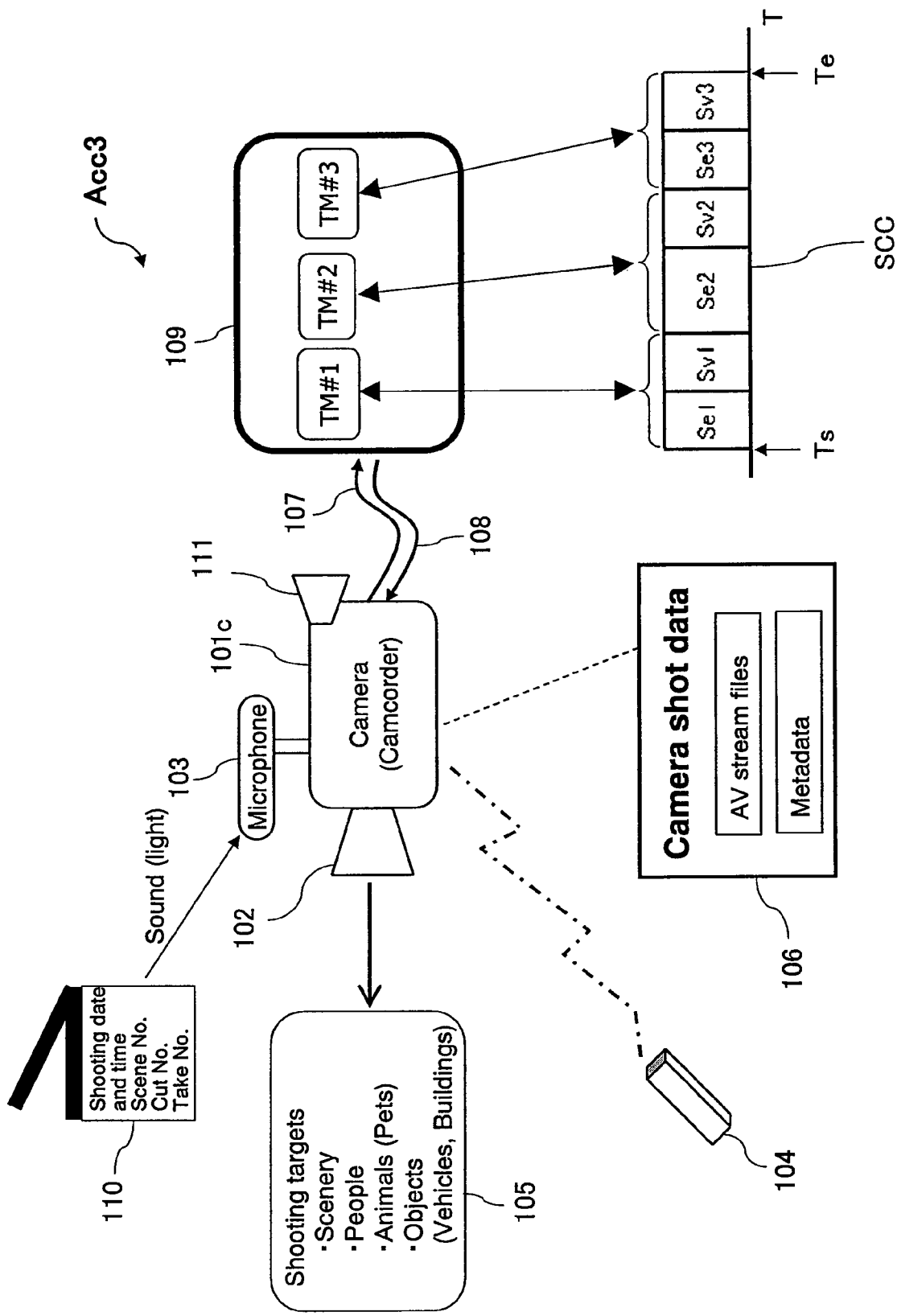
FIG. 11 is a diagram for explaining a content shooting apparatus according to a third embodiment of the present invention.

Referring to FIGS. 11, 12, 13, 14, and 15, a content shooting apparatus according to a third embodiment of the present invention will be described below. As shown in FIG. 11, a content shooting apparatus Acc3 according to the present embodiment basically has the same configuration as the content shooting apparatus Acc1 shown in FIG. 1. However, the content shooting apparatus Acc3 has the function with which metadata associated (marked) with a specific time code for identifying a clip can be registered in response to specific audio caught by the microphone 103. Examples of the specific audio include clapping sound made by a clapperboard 110, and gunshots for footraces in athletic meets, but it can be arbitrarily set by the shooter. Note that the present embodiment will be described with respect to the case where the clapperboard 110 is used as a source of such a sound.

The content shooting apparatus Acc3 includes a camera 101c, in place of the camera 101a of the content shooting apparatus Acc1, as shown in FIG. 11. The camera 101c preferably has an electronic viewfinder (hereinafter, "EVF") 111 attached thereto. Note that instead of using the EVF 111, a liquid crystal monitor provided in the camera 101c or a television set 109 may be used.

Figure 12:
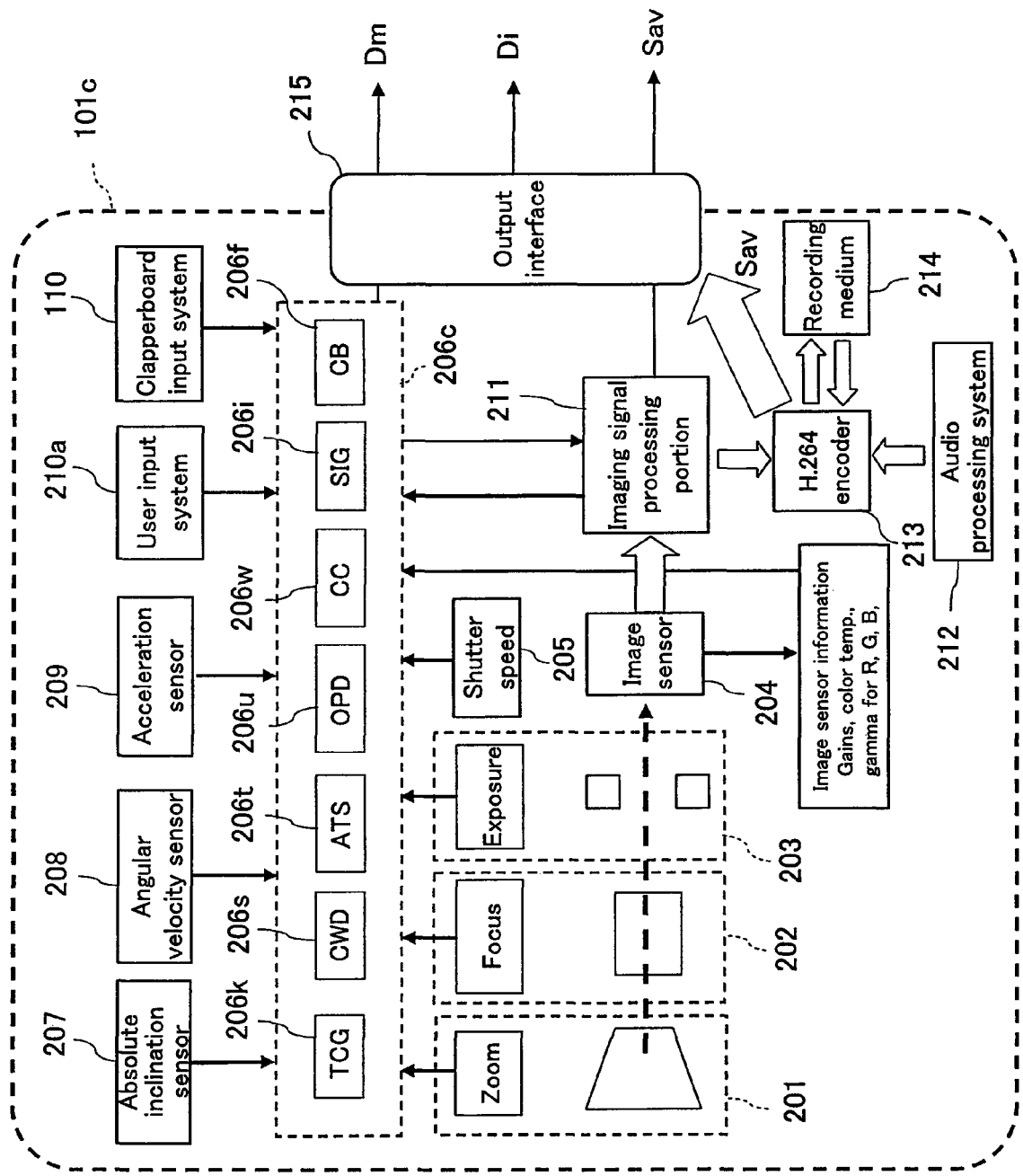
FIG. 12 is a diagram for explaining the internal configuration of a camera shown in FIG. 11.

As shown in FIG. 12, the camera 101c includes a microcomputer 206c, in place of the microcomputer 206a of the camera 101a, and it additionally includes a clapperboard input system 110. The microcomputer 206c is provided by adding to the microcomputer 206a a clip identification portion (indicated as "CB" in FIG. 12) 206f configured by a software algorithm. In the microcomputer 206c, a time code generation portion 206k and the clip identification portion 206f correlate a time code and scene description metadata to a scene shot when clapping the clapperboard, based on a clapperboard signal inputted from the clapperboard input system 110.

For example, scene information (SI) shown on the clapperboard 110, such as date and time of shooting, scene No., cut No., take No., and acceptance/rejection/abeyance of the take (normally instructed by the director at the shooting set), is correlated to a time code for the time at which the clapperboard 110 was clapped in the shot clip. In the present example, a clip spans from the start to the end of the shooting. As a result, the scene information (SI) can be correlated to the time code at the beginning of a valid portion in the shot clip.

With the scene information (SI), it is possible to facilitate deletion of unnecessary recorded data from the start of recording by the camera to the time at which the clapperboard 110 was clapped, sorting out of recorded clips deemed "accepted", and rearrangement of scene Nos., cut Nos., and take Nos. of the sorted-out shot clips. Specifically, a plurality of playlists described in the playlist folder (PlayList) shown in FIG. 7 can be readily rearranged based on take Nos. described in the playlists. For example, in the case of shooting in an athletic meet, it is possible to quickly call up a frame image at the beginning of, for example, a footrace (sprint race), a long-distance race, such as relay, a tug of war, or a ball-shooting race.

Figure 13:
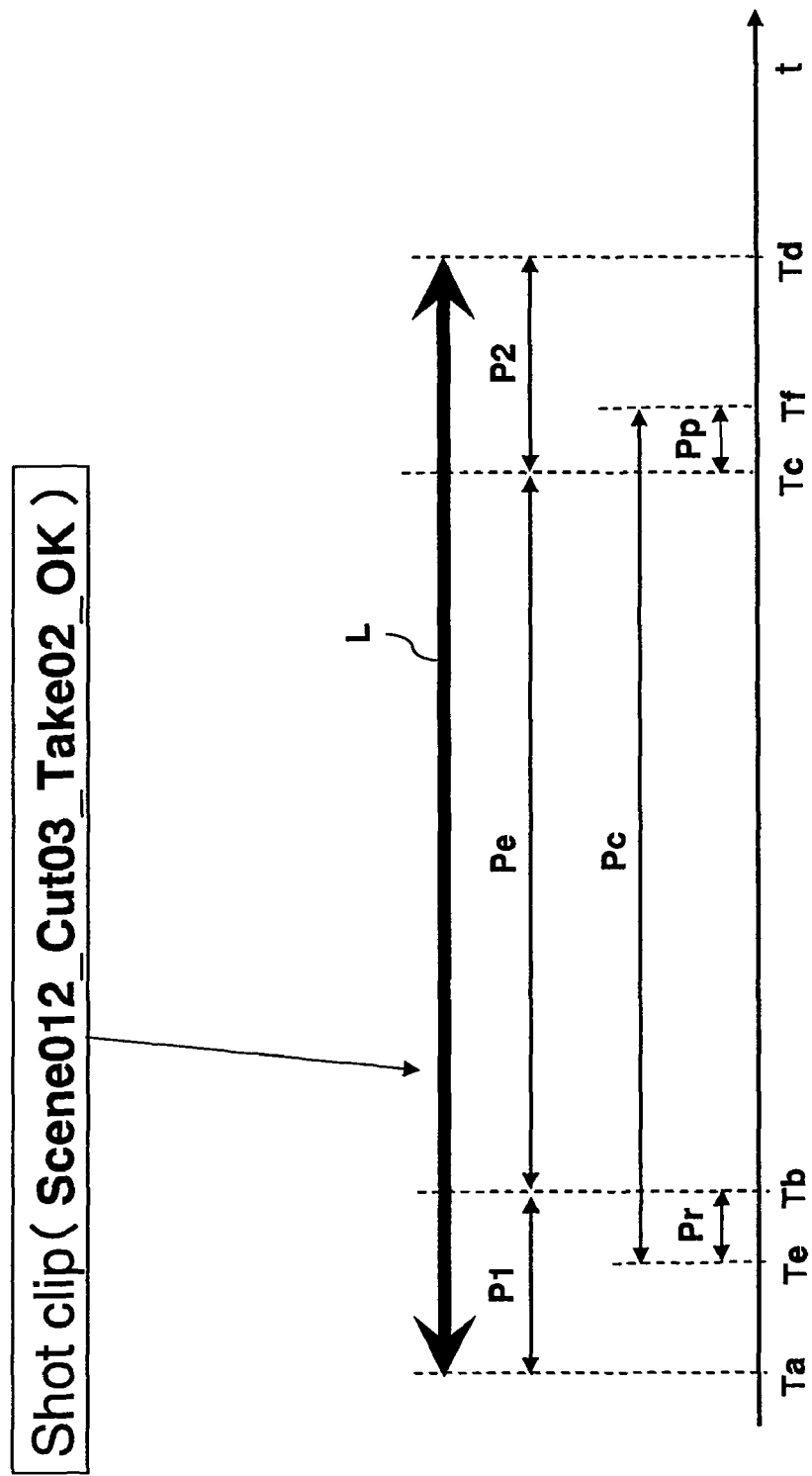
FIG. 13 is a diagram for explaining valid and invalid portions of a shooting clip.

Referring next to FIG. 13, the valid portion and the invalid portion of the shot clip will be described. In FIG. 13, the horizontal axis denotes time t, and the solid line L represents a video sequence. Concretely, the character Ta denotes the start time of recording by the camcorder (camera 101), the character Tb denotes the start time of actual shooting at which the clapperboard 110 was clapped once, the character Tc denotes the end time of actual shooting at which the clapperboard 110 was clapped twice, and the character Td denotes the end time of recording by the camcorder (camera 101c).

In the present example, the time interval P1 between the start time of recording Ta and the start time of actual shooting Tb is set to 10 seconds, and the time interval P2 between the end time of actual shooting Tc and the end time of recording Td is set to 12 seconds. In this case, for example, an image at the start time of actual shooting Tb when the clapperboard was clapped once can be selected as a representative image of the shot clip. In addition, for example, a metafile (Scene012_Cut03_Take02_OK) representing a clip at the start time of actual shooting Tb is generated, and a thumbnail at the start time of actual shooting Tb of the clip is set as a representative thumbnail. In this case, the start time of actual shooting Tb is referred to as a representative time.

The start time of actual shooting Tb corresponds to the time at the beginning of a cut instructed by the shooting director, and the end time of actual shooting Tc corresponds to the time at the end of the cut instructed by the shooting director. Selectable as archive data for the shot clip is, for example, content from the time Te, three seconds before the start time of actual shooting Tb, to the time Tf, three seconds after the end time of actual shooting Tc at which the clapperboard was clapped twice. As a result, it is possible to reduce the amount of shot clip (content) to be archived.

In general, it is often the case that editing of AV contents involves fade-in and fade-out processing in order to splice scenes with other scenes in a natural manner. By allowing a margin of about three seconds at the beginning or end of the clip, it becomes possible to add various special effects to the content at a later time, thereby creating higher-quality content.

The time interval P1 is referred to as a preceding invalid period of actual shooting, the time interval P2 is referred to as a succeeding invalid period of actual shooting, and the time interval between the start time of actual shooting Tb and the end time of actual shooting Tc is referred to as a valid period of actual shooting Pe. The period from the time Te to the start time of actual shooting Tb is referred to as a pre-period of actual shooting Pr, and the period from the end time of actual shooting Tc to the time Te is referred to as a post-period of actual shooting Pp. In addition, the period from the time Te to the time Tf, which entirely encompasses the pre-period of actual shooting Pr, the valid period of actual shooting Pe, and the post-period of actual shooting Pp, is referred to as a clip archive period Pc.

Figure 7:
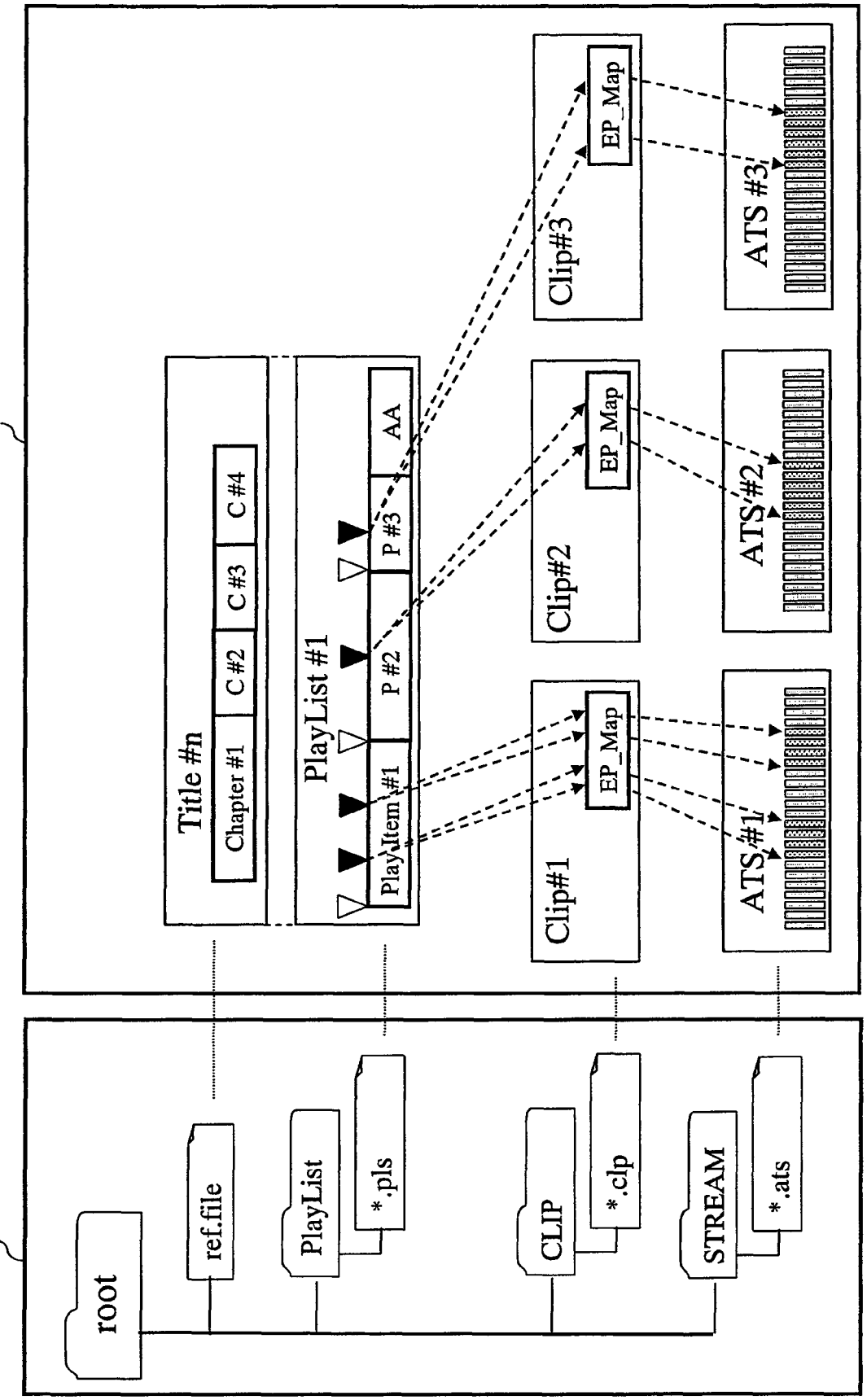
FIG. 7 is a diagram for explaining a directory structure and a file structure.

Scene numbers, cut numbers and take numbers in the scenario described in the clip files present in the clip file directory, as exemplified in FIG. 7, are arranged in the order of shooting, i.e., the order of shooting times. As described above, the scene numbers, the cut numbers, and the take numbers are arranged chronologically, but they are not arranged in the order as specified in the scenario. Therefore, if the arrangement is left unchanged, it is not possible to perform playback in accordance with the flow of the scenario. In the present embodiment, the following two methods allow such clip files to be played back in accordance with the flow of the scenario.

The first method will be described first. In this method, the user issues a command to the camera microcomputer 206c to arrange only accepted cuts in recorded takes in accordance with the order of scene numbers and cut numbers in the scenario. In response to the command, the clip files are arranged and displayed on the EVF 111 in accordance with the order of scene numbers and cut numbers in the scenario. The video display on the EVF 111 can also be provided on an external monitor such as a TV. As a result, it becomes possible to efficiently perform movie making and post production, such as editing according to the order of scene numbers and cut numbers in the scenario. Note that instead of using the EVF 111, a liquid crystal monitor provided in the camera or the television set 109 may be used.

In the second method, the user instructs the camera microcomputer 206c to extract scene numbers, cut numbers and take numbers in the scenario for accepted "OK" cuts in recorded takes, and assign a new name to (rename) the file using a code generated by connecting these numbers. The original file name is saved as clip file metadata (indicated in XML notation as <original filename>). Such a change of file name is applied to all the files with the same name present in the directories indicated in FIG. 7.

As described above, the file name represents the scene number, the cut number and the take number in the scenario, and therefore if the arrangement on the EVF 111 is made in accordance with the order of scene numbers and cut numbers in the scenario, visual comparison with the scenario can be readily made. For example, the clip file name of a cut with the scene number 32, the cut number 5, and the take number 2 is expressed as "S032_C05_T02.clpi". Note that the video display on the EVF 111 can also be provided on an external monitor such as a TV, and therefore it is possible to efficiently perform movie making and post production, such as editing according to the order of scene numbers and cut numbers in the scenario.

Also, in some cases, the necessity arises to additionally insert a new cut that is not shown in the scenario. Such a case can be addressed by inscribing, for example, a symbol, such as 1, 2, or 3 or a, b, or c (lowercase alphabetical character), which represents the insertion, between the cut number and the take number. In the case of inserting a new cut "b" into the aforementioned clip file "S032_C05_T02.clpi", the file name is expressed as "S032_C05b_T02.clpi", for example. As such, additional insertion of a new cut is possible.

Figure 14:
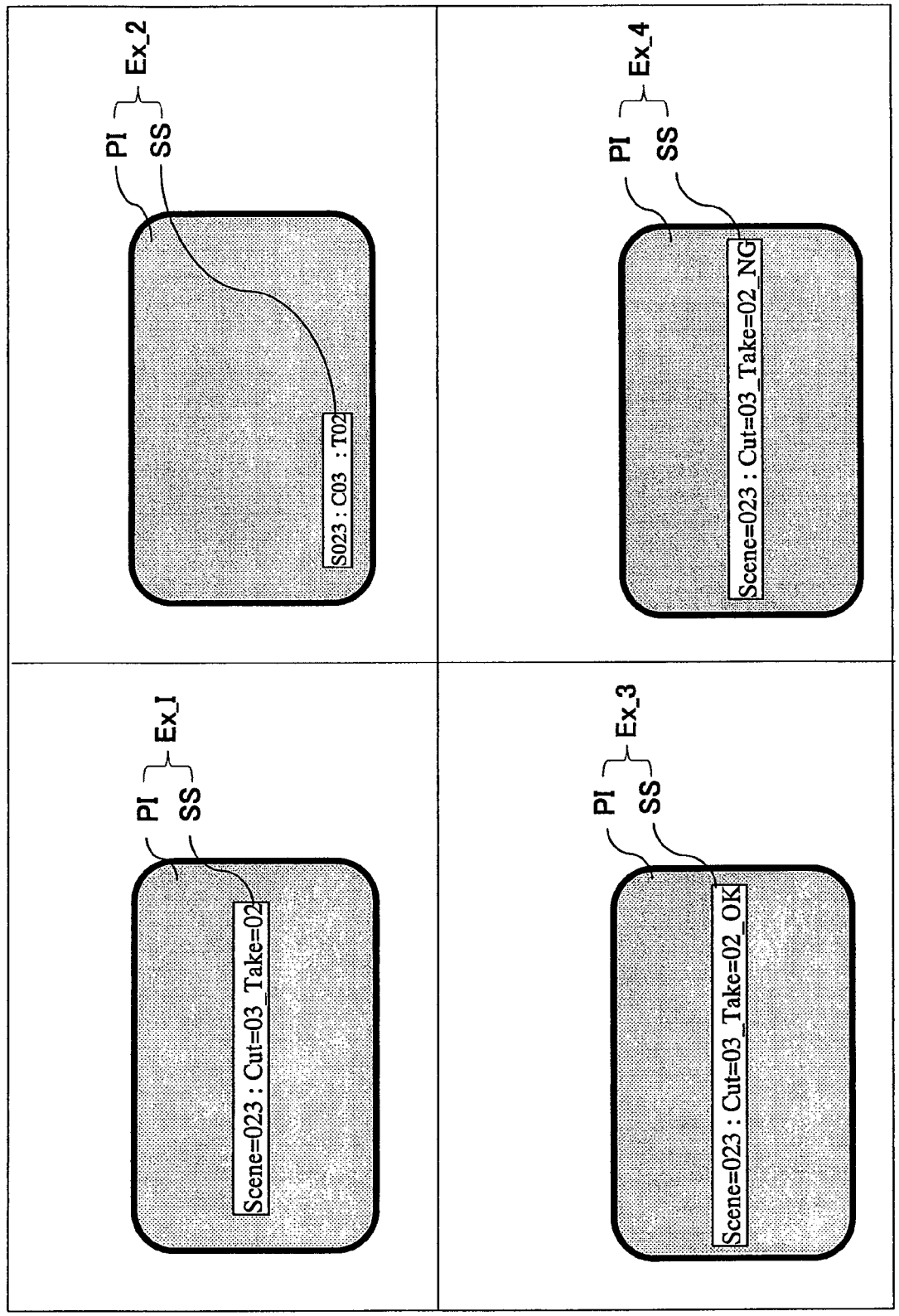
FIG. 14 is a diagram for explaining an EVF display.

Referring next to FIG. 14, a method for registering the shot scene information SI (concerning the scene number, the cut number, the take number, and acceptance, rejection, abeyance, etc., of the recorded take) based on an EVF display will be described. In the figure, the character Ex_1 denotes an exemplary EVF display when the user used a remote controller to set the scene number, the cut number, and the take number. In this example, "Scene=023:Cut=03_Take=02" is displayed as a user setting SS at the center of the EVF with the shot video PI by the camera 101c on the background.

The character Ex_2 denotes an exemplary EVF display during shooting. In this example, "S023:C03:T02", the setting information SS concerning the scene number, the cut number, and the take number, is displayed on one side of the EVF with the shot video PI on the background, so that the scene number, the cut number, and the take number can be monitored even during shooting. In this example, the setting SS is simplified compared to the example with the character Ex_1, considering that it is displayed on one side of the EVF.

The character Ex_3 denotes an exemplary confirmation screen when the shot take was accepted. In this example, "OK" is additionally displayed as the setting SS following "scene number, cut number, and take number" to mean the acceptance.

The character Ex_4 denotes an exemplary confirmation screen when the shot take was rejected. In this example, "NG" is additionally displayed as the setting SS following "scene number, cut number, and take number" to mean the rejection.

Figure 15:
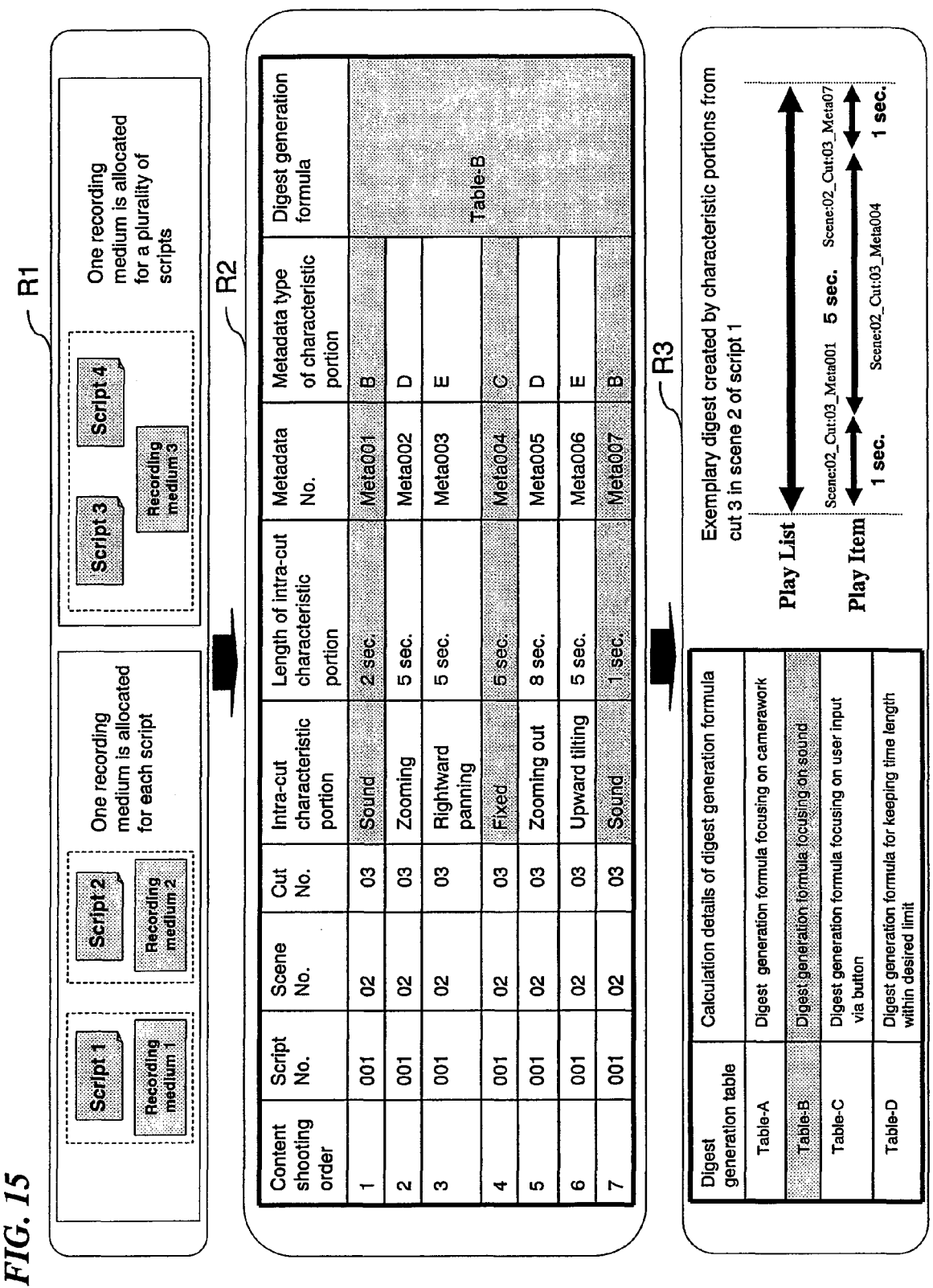
FIG. 15 is a diagram showing the relationships among script, recording medium, scene number, cut number, take number, take acceptance/rejection information, PlayList, and PlayItem.

Referring to FIG. 15, the relationships among the script, the recording medium, the scene number, the cut number, the take number, the take acceptance/rejection information, the PlayList, and the PlayItem will be described. In the figure, graphic illustration R1 shows the relationship between the shooting scripts (scenarios) and the recording media. As can be appreciated from graphic illustration R1, there are two cases: one being the case where one recording medium is allocated for each script, and the other being the case where only one recording medium is allocated for a plurality of scripts.

Graphic illustration R2 shows a table containing information on a specific shooting date (recording date), concerning content shooting (recording) order, script number, scene number, cut number, intra-cut characteristic portion, length of intra-cut characteristic portion, metadata type of characteristic portion, and digest generation formula. Although not shown in the figure, the table preferably contains the take number and the cut acceptance/rejection information for identifying the take accepted for each cut.

Graphic illustration R3 shows the relationships of the script number, the scene number, the cut number, the take number, and the take accepted for each cut with respect to the PlayItem. In the present example, the PlayList consists of three PlayItems, each being associated with the scene number, the cut number, the take number, and the acceptance/rejection information for each cut.

Through the user operation, the microcomputer 206c can select, as archive data for the shot clip, content from arbitrary time Te before the start of actual shooting, at which the clapperboard 110 was clapped once, to arbitrary time Tf after the end of actual shooting, at which the clapperboard 110 was clapped twice, as exemplified in FIG. 11. Thus, it is possible to flexibly manage and operate the amount of actual shooting content to be archived (the clip archive period Pc).

The pre-period of actual shooting Pr and the post-period of actual shooting Pp can be received and operated by the camera 101b as metadata from an edit application running on a personal computer. In addition, the edit application can be operated if the pre-period of actual shooting Pr and the post-period of actual shooting Pp are conversely passed from the camera 101b to the edit application as metadata. Note that in the case of hearing, for example, a gunshot, rather than the sound of the clapperboard 110, at a location about 100 meter away from the gun, it is necessary to manage the content after calculating the start time of actual shooting Th and the end time of actual shooting Tc with consideration of sound delay in sound speed (about 350 meter per second).

For example, in the case of shooting in an athletic meet, by detecting a gunshot or the sound of a drum, which is used in, for example, sprint races, long-distance races, tugs of war, or ball-shooting races, it becomes possible to generate metadata representing footraces (sprint races), long-distance races, such as relays, tugs of war, ball-shooting races, or performance, based-on the time at which the gunshot or the sound of the drum was detected. Also, in order to detect the time at which the clap of the clapperboard or the gunshot occurs more exactly than when making a frame-by-frame detection (in the case of NTSC, one frame corresponds to 33.3 msec), an audio signal (e.g., WAVE signal) for the frame is analyzed to calculate more accurate time.

For example, metadata can be associated with the shot clip using a mobile terminal, such as a cell phone, to provide real-time text input concerning the location, weather, and expression and condition of actors during shooting, and transmit such information as shooting condition metadata to the camcorder (camera 101c) via infrared.

The user initially sends a marker to the camera upon start of the text input by the mobile terminal, and remembers the time of start. At this time, the camera preferably returns its ID number to the mobile terminal. Thereafter, upon completion of the text input by the mobile terminal, the ID information and text information concerning completion of the input are sent to the camera, so that they are registered on the recording medium in the camera as metadata as of the start time of the input. Thus, it is possible to more correctly assign metadata to content of actual shooting that corresponds to the time at which it is desirable to input the metadata.

As described above, the content shooting apparatus according to the present invention makes it possible to appropriately calibrate thresholds for metadata generation by monitoring camerawork, such as panning and zooming, for a predetermined period of time during shooting of moving images. Furthermore, the camera-fixing status as to whether the camera is held in hand or stabilized by a tripod stand is automatically determined, and a threshold for determining whether camerawork is normal or abnormal can be automatically set. Thus, it is possible to classify valid scenes and invalid scenes in a more exact manner, in accordance with the quality of camerawork, such as "held in hand" or "stabilized by a tripod stand", so that deletion of any invalid portions, which are misshots, as well as generation of a digest consisting of important shots, can be achieved with higher quality. In addition, information, such as time code, can be assigned to scenes in conjunction with a clapperboard or suchlike, thereby assigning metadata to target content.

In the content shooting apparatus Acc3, the camera microcomputer 206c (scene information generation portion 206i) is configured to function as a metadata selection memory for holding a recording result tag which refers to acceptance, rejection, or abeyance of content data (Sav) and is generated in accordance with a command inputted by the user, during or after the operation of recording the AV signal Sav, i.e., content data.

Furthermore, the camera microcomputer 206c is configured to have the functions of:

inputting information including at least one of the following content-related items to the memory in the shooting apparatus as the recording information tag before shooting contents: serial shooting number, shot scene number, shot cut number, shot take number, and shooting program information;

detecting characteristic sound to generate a characteristic sound generation tag, including occurrence time (Tb) and identification information concerning the characteristic sound, during the operation of recording the shot contents; and recording the characteristic sound generation tag to the recording medium 214 as metadata for the contents. Note that the characteristic sound is clapping sound made by a clapperboard, a gunshot, or sound made by a drum.

The camera microcomputer 206c is configured to have the function of rearranging the contents recorded on the recording medium 214 that have a recording result tag indicating "acceptance (OK)", in ascending order of any of the following: the scene number, the cut number, and the take number.

The camera microcomputer 206c is configured to have the function of registering, as a new name for contents, information including at least one of the following content-related items: serial shooting number, shot scene number, shot cut number, shot take number, and shooting program information, and registering contents' original name as content metadata.

INDUSTRIAL APPLICABILITY

The present invention is applicable to content shooting apparatuses for use in shooting of moving images, for example.

The invention claimed is:

1. A content shooting apparatus for recording content data containing video, audio, or data onto a recording medium, in combination with first metadata generated with reference to first scene information representing a scene, and allowing access to a specific portion of the content data with reference to second scene information independently generated with reference to the first scene information, the apparatus comprising:

a camera for shooting a subject to generate the content data; and a calculating means for performing calculation for processing of the content data, wherein the calculating means is configured to perform:

detecting movement of the camera;

comparing the detected movement with a predetermined value, hereby generating first metadata; and filtering out one or more pieces of the first metadata generated within a predetermined specific window period by means of a predetermined function, thereby generating second metadata containing any one of scene type, priority, start time, end time, and representative time.

2. The content shooting apparatus according to claim 1, wherein the predetermined function calculates a weighted total priority value of metadata generated within a window period of a predetermined length.

3. The content shooting apparatus according to claim 1, wherein the predetermined function sorts out highest-priority first metadata from among the first metadata generated within a window period of a predetermined length.

4. The content shooting apparatus according to claim 1, wherein the predetermined function sets one parameter at every interval of a predetermined period or longer.

5. The content shooting apparatus according to claim 4, wherein the predetermined function compulsorily adds one or more parameters upon each occurrence of a predetermined period within which no parameter is selected.

6. The content shooting apparatus according to claim 1, wherein the calculating means is further configured to perform generating a playlist by combining a plurality of scenes with reference to at least one of the following parameters contained in the second metadata: scene type, priority, start time, end time, and representative time.

7. The content shooting apparatus according to claim 1, wherein the calculating means is further configured to perform sorting out the parameters contained in the second metadata with reference to the priority, such that the number of parameters is within a specified range.

8. The content shooting apparatus according to claim 6, wherein the calculating means is further configured to perform providing descriptions about characteristics of characteristic scene sections composed of the second metadata, the characteristics being superimposed on playback video as tickers while playing back the scene sections in a specified order.

9. The content shooting apparatus according to claim 1, wherein the calculating means is further configured to perform selecting a content component associated with the parameter, such that an externally-provided digest playback time is not exceeded.

10. The content shooting apparatus according to claim 1, wherein the calculating means is further configured to perform:

receiving a specification of at least one of the following items concerning characteristic scenes to be included in a digest: priority, type, digest time length, and content-to-digest reduction ratio;

generating a file to be referenced for playing back the content data in accordance with a specified digest generation scheme with reference to a second priority list, which is auxiliary data for the file to be referenced for playback; and registering the file to be referenced for playback with a playback object list.

11. The content shooting apparatus according to claim 1, further comprising a memory, wherein the calculating means is further configured to perform:

detecting characteristic sound and generating characteristic sound metadata containing occurrence time and identification information concerning the characteristic sound; and holding in the memory an output from the characteristic sound metadata generation means.

12. The content shooting apparatus according to claim 1, wherein the parameter is any one of operation data concerning a lens portion in a camera, which at least indicates zooming status, aperture value, focal distance and shutter speed of the lens portion, horizontal or vertical inclination angle of the lens portion, angular velocity of the lens portion rotating in a horizontal or vertical direction, or forward-backward, rightward-leftward, or vertical movement acceleration of the lens portion; a user input command; or data obtained performing a predetermined process on the operation data.

13. The content shooting apparatus according to claim 1, further comprising a memory, wherein the calculating means is further configured to perform:

generating a recording result tag, which refers to acceptance, rejection, or abeyance of the content data in accordance with a command inputted by a user, during or after an operation of recording the content data; and holding in the memory an output from the recording result tag generation means.

14. The content shooting apparatus according to claim 1, further comprising a memory, wherein the calculating means is further configured to perform:

inputting content-related information to the memory in the shooting apparatus as a recording information tag before shooting the subject, the information containing at least one of a serial shooting number, a shot scene number, a shot cut number, a shot take number, and shooting program information;

for detecting characteristic sound and generating a characteristic sound generation tag, including occurrence time and identification information concerning the characteristic sound, during an operation of recording the shot content data; and recording the characteristic sound generation tag onto the information recording medium as metadata for the content data.

15. The content shooting apparatus according to claim 14, wherein the characteristic sound is clapping sound made by a clapperboard, a gunshot, or sound made by a drum.

16. The content shooting apparatus according to claim 14, wherein the calculating means is further configured to perform rearranging the contents recorded on the recording medium that have a recording result tag indicating "acceptance", in ascending order of any one of the scene number, the cut number, and the take number.

17. The content shooting apparatus according to claim 14, wherein the calculating means is further configured to perform:

registering content-related information as a new name for content data, the information containing at least one of a serial shooting number, a shot scene number, a shot cut number, a shot take number, and shooting program information; and registering the contents' original name as metadata for the content data.

18. The content shooting apparatus according to claim 13, further comprising a memory, wherein the calculating means is further configured to perform: inputting content-related information to the memory as a recording information tag before shooting contents, the information containing at least one of a serial shooting number, a shot scene number, a shot cut number, a shot take number, and shooting program information;

detecting characteristic sound to generate a characteristic sound generation tag, including occurrence time and identification information concerning the characteristic sound, during an operation of recording the shot content data; and recording the characteristic sound generation tag onto the information recording medium as metadata for the content data.

19. The content shooting apparatus according to claim 18, wherein the characteristic sound is clapping sound made by a clapperboard, a gunshot, or sound made by a drum.

20. The content shooting apparatus according to claim 18, wherein the calculating means is further configured to perform rearranging the content data recorded on the recording medium that have a recording result tag indicating "acceptance", in ascending order of any one of the scene number, the cut number, and the take number.

21. The content shooting apparatus according to claim 18, wherein the calculating means is further configured to perform:

registering content-related information as a new name for contents, the information containing at least one of a serial shooting number, a shot scene number, a shot cut number, a shot take number, and shooting program information; and registering the contents' original name as metadata for the contents.

22. The content shooting apparatus according to claim 1, wherein the calculating means is further configured to perform selecting a table on which priority of the parameters is indicated, every time at least one of selected among a predetermined number of operating modes of the content shooting apparatus, the operating modes being in accordance with the varying priorities of the parameters.

23. The content shooting apparatus according to claim 1, wherein the calculating means includes a microcomputer.

\* \* \* \* \*